(12) United States Patent
Alla et al.

(10) Patent No.: US 11,830,028 B2
(45) Date of Patent: *Nov. 28, 2023

(54) METHODS AND APPARATUS TO COLLECT DISTRIBUTED USER INFORMATION FOR MEDIA IMPRESSIONS

(71) Applicant: The Nielsen Company (US), LLC, New York, NY (US)

(72) Inventors: Madhusudhan Reddy Alla, Richardson, TX (US); John R. Burbank, Stamford, CT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,709

(22) Filed: Dec. 20, 2021

(65) Prior Publication Data

US 2022/0114613 A1 Apr. 14, 2022

Related U.S. Application Data

(63) Continuation of application No. 16/049,478, filed on Jul. 30, 2018, now Pat. No. 11,205,191, which is a
(Continued)

(51) Int. Cl.
*G06Q 30/00* (2023.01)
*G06Q 30/0242* (2023.01)
*G06Q 30/0251* (2023.01)

(52) U.S. Cl.
CPC ..... *G06Q 30/0242* (2013.01); *G06Q 30/0251* (2013.01); *G06Q 30/0259* (2013.01);
(Continued)

(58) Field of Classification Search
CPC .......................................... G06Q 30/02–0277
See application file for complete search history.

(56) References Cited

U.S. PATENT DOCUMENTS

| 3,540,003 | A | 11/1970 | Murphy |
| 3,818,458 | A | 6/1974 | Deese |

(Continued)

FOREIGN PATENT DOCUMENTS

| AU | 2013205736 | 5/2013 |
| AU | 2015230772 | 10/2015 |

(Continued)

OTHER PUBLICATIONS

Adam et al., "Privacy Preserving Integration of Health Care Data," AMIA 2007 Symposium Proceedings, 6 pages.
(Continued)

*Primary Examiner* — Raquel Alvarez

(57) ABSTRACT

A disclosed example includes memory; instructions in the apparatus; and processor circuitry to execute the instructions to: monitor for a mobile device communication at a merchant location; obtain a first identifier from the mobile device communication obtained at a first server in response to identifying the mobile device communication during the monitoring; store the first identifier in association with the merchant location in a database; and in response to determining that the first identifier is present in the database, send an association between the first identifier and the merchant location to a second server of an audience measurement entity, the first identifier included in a second communication from the second server of the audience measurement entity.

22 Claims, 22 Drawing Sheets

Related U.S. Application Data continuation of application No. 14/014,050, filed on Aug. 29, 2013, now Pat. No. 10,068,246.

(60) Provisional application No. 61/845,748, filed on Jul. 12, 2013.

(52) U.S. Cl.
CPC ..... *G06Q 30/0261* (2013.01); *G06Q 30/0267* (2013.01); *G06Q 30/0269* (2013.01); *G06Q 30/0271* (2013.01)

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,182,770 A | 1/1993 | Medveczky et al. |
| 5,204,897 A | 4/1993 | Wyman |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,127,305 B1 | 10/2006 | Palmon |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,323,991 B1 | 1/2008 | Eckert et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,444,388 B1 | 10/2008 | Svendsen |
| 7,526,538 B2 | 4/2009 | Wilson |
| 7,546,370 B1 | 6/2009 | Acharya et al. |
| 7,590,568 B2 | 9/2009 | Blumenau |
| 7,593,576 B2 | 9/2009 | Meyer et al. |
| 7,600,014 B2 | 10/2009 | Russell et al. |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,087,041 B2 | 12/2011 | Fu et al. |

(56) References Cited

U.S. PATENT DOCUMENTS

| | | |
|---|---|---|
| 8,117,193 B2 | 2/2012 | Svendsen et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |
| 8,180,112 B2 | 5/2012 | Kurtz et al. |
| 8,229,458 B2 | 7/2012 | Busch |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,307,458 B2 | 11/2012 | Kasahara et al. |
| 8,370,489 B2 | 2/2013 | Mazumdar et al. |
| 8,387,084 B1 | 2/2013 | Klappert et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,514,907 B2 | 8/2013 | Wright et al. |
| 8,515,459 B2 | 8/2013 | Busch |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,626,084 B2 | 1/2014 | Chan et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,083,853 B2 | 7/2015 | Shkedi |
| 9,106,709 B2 | 8/2015 | Desilva et al. |
| 9,117,217 B2 | 8/2015 | Wilson et al. |
| 9,210,130 B2 | 12/2015 | Burbank et al. |
| 9,215,288 B2 | 12/2015 | Seth et al. |
| 9,218,612 B2 | 12/2015 | Mazumdar et al. |
| 9,237,138 B2 | 1/2016 | Bosworth et al. |
| 9,301,007 B2 | 3/2016 | Ramaswamy |
| 9,449,290 B1 | 9/2016 | Cavanaugh et al. |
| 9,519,914 B2 | 12/2016 | Splaine et al. |
| 9,589,271 B2 | 3/2017 | Bender et al. |
| 10,068,246 B2 | 9/2018 | Alla et al. |
| 11,205,191 B2 | 12/2021 | Alla et al. |
| 2002/0099609 A1 | 7/2002 | Nascenzi et al. |
| 2002/0128925 A1 | 9/2002 | Angeles |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0044768 A1 | 3/2004 | Takahashi |
| 2004/0088212 A1 | 5/2004 | Hill |
| 2004/0098229 A1 | 5/2004 | Error et al. |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0033657 A1 | 2/2005 | Herrington et al. |
| 2005/0038900 A1 | 2/2005 | Krassner et al. |
| 2005/0166233 A1 | 7/2005 | Beyda et al. |
| 2005/0223093 A1 | 10/2005 | Hanson et al. |
| 2005/0262573 A1 | 11/2005 | Bo et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0184617 A1 | 8/2006 | Nicholas et al. |
| 2006/0190616 A1 | 8/2006 | Mayerhofer et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0208711 A1 | 9/2007 | Rhoads et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2007/0300309 A1 | 12/2007 | Naito |
| 2008/0004958 A1 | 1/2008 | Ralph et al. |
| 2008/0086356 A1 | 4/2008 | Glassman et al. |
| 2008/0086523 A1 | 4/2008 | Afergan et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0262928 A1 | 10/2008 | Michaelis |
| 2008/0276179 A1 | 11/2008 | Borenstein et al. |
| 2008/0300965 A1 | 12/2008 | Doe |
| 2009/0018895 A1 | 1/2009 | Weinblatt et al. |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0125934 A1 | 5/2009 | Jones et al. |
| 2009/0171762 A1 | 7/2009 | Alkove et al. |
| 2009/0217315 A1 | 8/2009 | Malik et al. |
| 2009/0254633 A1 | 10/2009 | Olive |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0114739 A1 | 5/2010 | Johnston |
| 2010/0121676 A1 | 5/2010 | Jackson |
| 2010/0153175 A1 | 6/2010 | Pearson et al. |
| 2010/0153207 A1 | 6/2010 | Roberts et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0306080 A1 | 12/2010 | Trandal et al. |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0055005 A1 | 3/2011 | Lang |
| 2011/0066497 A1 | 3/2011 | Gopinath et al. |
| 2011/0087519 A1 | 4/2011 | Fordyce et al. |
| 2011/0087919 A1 | 4/2011 | Deshmukh et al. |

(56) References Cited

U.S. PATENT DOCUMENTS

| | | |
|---|---|---|
| 2011/0093324 A1 | 4/2011 | Fordyce et al. |
| 2011/0093327 A1 | 4/2011 | Fordyce et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0282997 A1 | 11/2011 | Prince et al. |
| 2011/0288907 A1 | 11/2011 | Harvey et al. |
| 2012/0005015 A1 | 1/2012 | Park et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0046996 A1 | 2/2012 | Shah et al. |
| 2012/0072469 A1 | 3/2012 | Perez et al. |
| 2012/0094639 A1 | 4/2012 | Carlson et al. |
| 2012/0109709 A1 | 5/2012 | Fordyce et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0130799 A1 | 5/2012 | Atwater et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0221559 A1 | 8/2012 | Kidron |
| 2012/0239407 A1 | 9/2012 | Lynch et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0014223 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0073388 A1 | 3/2013 | Heath |
| 2013/0073859 A1 | 3/2013 | Carlson et al. |
| 2013/0080256 A1 | 3/2013 | Piccionelli |
| 2013/0080259 A1 | 3/2013 | Durvasula et al. |
| 2013/0080263 A1 | 3/2013 | Goldman et al. |
| 2013/0080268 A1 | 3/2013 | Gordon et al. |
| 2013/0085894 A1 | 4/2013 | Chan et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0198383 A1 | 8/2013 | Tseng et al. |
| 2013/0204694 A1 | 8/2013 | Banister et al. |
| 2013/0212188 A1 | 8/2013 | Duterque et al. |
| 2013/0212638 A1 | 8/2013 | Wilson |
| 2013/0237254 A1 | 9/2013 | Papakipos et al. |
| 2013/0246220 A1 | 9/2013 | Hammad et al. |
| 2013/0246389 A1 | 9/2013 | Osann, Jr. |
| 2013/0246609 A1 | 9/2013 | Topchy et al. |
| 2013/0254897 A1 | 9/2013 | Reedy et al. |
| 2013/0268365 A1 | 10/2013 | Gildfind |
| 2013/0282898 A1 | 10/2013 | Kalus et al. |
| 2013/0290070 A1 | 10/2013 | Abraham et al. |
| 2013/0290096 A1 | 10/2013 | Lizotte |
| 2013/0297411 A1 | 11/2013 | van Datta et al. |
| 2013/0297467 A1 | 11/2013 | Kidron et al. |
| 2013/0325588 A1 | 12/2013 | Kalyanam et al. |
| 2013/0326597 A1 | 12/2013 | Matsushita et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0040171 A1 | 2/2014 | Segalov et al. |
| 2014/0058836 A1 | 2/2014 | Wiseman et al. |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0123253 A1 | 5/2014 | Davis et al. |
| 2014/0156761 A1 | 6/2014 | Heffernan et al. |
| 2014/0173746 A1 | 6/2014 | Armstrong-Muntner et al. |
| 2014/0207567 A1 | 7/2014 | Gould et al. |
| 2014/0278981 A1 | 9/2014 | Mersov et al. |
| 2014/0279074 A1 | 9/2014 | Chen et al. |
| 2014/0280896 A1 | 9/2014 | Papakostas et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019327 A1 | 1/2015 | Mazumdar et al. |
| 2015/0046248 A1 | 2/2015 | Ben-Yaacov et al. |
| 2015/0046579 A1 | 2/2015 | Perez et al. |
| 2015/0066586 A1 | 3/2015 | Teraoka et al. |
| 2015/0070585 A1 | 3/2015 | Sharif-Ahmadi et al. |
| 2015/0100907 A1 | 4/2015 | Erenrich et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |
| 2016/0063539 A1 | 3/2016 | Alla et al. |
| 2017/0018184 A1 | 1/2017 | Northrup et al. |
| 2021/0012373 A1 | 1/2021 | Alla et al. |

FOREIGN PATENT DOCUMENTS

| | | |
|---|---|---|
| CA | 2777170 | 4/2011 |
| CA | 2872704 | 2/2016 |
| CN | 1898662 | 1/2007 |
| CN | 101077014 | 11/2007 |
| CN | 101222348 | 7/2008 |
| CN | 101473340 | 7/2009 |
| CN | 101505247 | 8/2009 |
| CN | 101536503 | 9/2009 |
| CN | 103473721 | 12/2013 |
| CN | 104054055 | 9/2014 |
| EP | 325219 | 7/1989 |
| EP | 703683 | 3/1996 |
| EP | 744695 | 11/1996 |
| EP | 1059599 | 12/2000 |
| EP | 2991018 | 3/2016 |
| GB | 2176639 | 12/1986 |
| JP | H05324352 | 12/1993 |
| JP | H07262167 | 10/1995 |
| JP | 2001084272 | 3/2001 |
| JP | 2001282982 | 10/2001 |
| JP | 2001357192 | 12/2001 |
| JP | 2002091852 | 3/2002 |
| JP | 2002163562 | 6/2002 |
| JP | 2002373152 | 12/2002 |
| JP | 2003519877 | 6/2003 |

(56) References Cited

FOREIGN PATENT DOCUMENTS

| | | |
|---|---|---|
| JP | 2004504674 | 2/2004 |
| JP | 2006127320 | 5/2006 |
| JP | 2006127321 | 5/2006 |
| JP | 2007052633 | 3/2007 |
| JP | 7262167 | 1/2010 |
| JP | 2010501939 | 1/2010 |
| JP | 2010039845 | 2/2010 |
| JP | 2010257448 | 11/2010 |
| KR | 100765735 | 10/1995 |
| KR | 20020037980 | 5/2002 |
| KR | 20070051879 | 5/2007 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 200152168 | 7/2000 |
| WO | 200207054 | 7/2000 |
| WO | 2000041115 | 7/2000 |
| WO | 2003027860 | 1/2005 |
| WO | 2005013072 | 2/2005 |
| WO | 2005024689 | 3/2005 |
| WO | 2008022339 | 2/2008 |
| WO | 2008150575 | 12/2008 |
| WO | 2009117733 | 9/2009 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 199600950 | 11/2012 |
| WO | 199632815 | 11/2012 |
| WO | 199637983 | 11/2012 |
| WO | 2012149138 | 11/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014172472 | 10/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Chloe Albanesius, "Facebook Issues Fix for Several Tracking Cookies," internet article, http://www.pcmag.com/article2/0,2817,2393750,00.asp, Sep. 28, 2011, 2 pages.
Emil Protalinski, "Facebook denies cookie tracking allegations," Internet article, http://www.zdnet.com/blog/facebook/facebook-denies-cookie-tracki- - ng-allegations/4044, Sep. 25, 2011, 2 pages.
Emil Protalinski, "Facebook fixes cookie behavior after logging out," internet article, http://www.zdnet.com/blog/facebook/facebook-fixes-cookie-behavior-after-1- - ogging-out/4120, Sep. 27, 2011, 2 pages.
Emil Protalinski, "US congressmen ask FTC to investigate Facebook cookies," internet article, http://www.zdnet.com/blog/facebook/US-congressmen-ask-ftc-to-investigate-- - facebook-cookies/4218, Sep. 28, 2011, 2 pages.
Fliptop, "Fliptop Person API Documentation," https://developer.fliptop.com/documentation, retrieved on May 7, 2013 (6 pages).
Fliptop, "Get Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
JavaScript and AJAX Forum, Sep. 28, 2005, [retrieved from Internet at http://www.webmasterworld.com/forum91/4465.htm on Jun. 29, 2011] 4 pages.
Launder, "Media Journal: Nielsen to Test Online-TV Viewing Tool," The Wall Street Journal, Apr. 30, 2013, 2 pages.
"Mental Poker," Wikipedia, Jan. 12, 2010, [retrieved from Internet at en.wikipedia.org/wiki/Mental_poker on Sep. 21, 2010] 5 pages.
"Nielsen Unveils New Online Advertising Measurement," The Nielsen Company, Sep. 27, 2010, [retrieved from Internet at http://nielsen.com/us/en/insights/press-room/2010/nielsen_unveils_newonli- -neadvertisingmeasurement.html on May 31, 2012] 3 pages.
Nik Cubrilovic, "Logging out of Facebook is not enough," internet article, www.nikcub.appspot.com, Sep. 25, 2011, 3 pages.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," All Things, Apr. 30, 2013, 3 pages.
Coffey, "Internet Audience Measurement: a Practitioner's View," Journal of Interactive Advertising, vol. 1, No. 2, Spring 2001, 8 pages.
Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
International Bureau, "International Preliminary Report on Patentability," issued in connection with PCT application No. PCT/US2011/052623, dated Mar. 26, 2013, 5 pages.
International Searching Authority, "International Preliminary Report on Patentability," issued in connection with application No. PCT/US2012/026760, dated Sep. 24, 2013, 4 pages.
International Searching Authority, "International Search Report," issued in connection with application No. PCT/US2011/052623, dated Mar, 8. 2012, 3 pages.
International Searching Authority, "International Search Report," issued in connection with application No. PCT/US2012/026760, dated Jan. 2, 2013, 3 pages.
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/052623, dated Mar. 8, 2012, 4 pages.
International Searching Authority, "Written Opinion," issued in connection with application No. PCT/US2011/065881, dated Jul. 9, 2012, 6 pages.
International Searching Authority, "Written Opinion," issued in connection with application No. PCT/US2012/026760, dated Jan. 2, 2013, 3 pages.
Patent Cooperation Treaty, "International Search Report," issued by the International Searching Authority in connection with PCT application No. PCT/US2011/052623, dated Mar. 8, 2012, 3 pages.
Patent Cooperation Treaty, "International Search Report," issued by the International Searching Authority in connection with PCT application No. PCT/US2011/065881, dated Jul. 9, 2012, 3 pages.
Patent Cooperation Treaty, "Written Opinion of the International Searching Authority," issued by the International Searching Authority in connection with PCT/US2011/052623, dated Mar. 8, 2012, 3 pages.

(56) References Cited

OTHER PUBLICATIONS

Patent Cooperation Treaty, "Written Opinion of the International Searching Authority," issued by the International Searching Authority in connection with PCT/US2011/065881, dated Jul. 9, 2012, 6 pages.
Patent Cooperation Treaty, "International Search Report and Written Opinion of the International Searching Authority," issued by the International Searching Authority in connection with PCT/US2013/045211, dated Feb. 25, 2014, 13 pages.
Australian Government, IP Australia, "Examination Report," issued in connection with application No. AU 2013205736, dated Jun. 18, 2013, 2 pages.
Japan Patent Office, "Notice of Reasons for Rejection," issued in connection with Application No. 2013-529435, dated Aug. 20, 2013, 4 pages.
United States Patent and Trademark Office, "Final Office Action," issued in connection with U.S. Appl. No. 13/690,915, dated Dec. 20, 2013, 6 pages.
United States Patent and Trademark Office, "Non-Final Office Action," issued in connection with U.S. Appl. No. 13/239,005, dated Jun. 4, 2013, 28 pages.
United States Patent and Trademark Office, "Non-Final Office Action," issued in connection with U.S. Appl. No. 13/690,915, dated Sep. 5, 2013, 36 pages.
United States Patent and Trademark Office, "Non-Final Office Action," issued in connection with U.S. Appl. No. 13/691,175, dated Sep. 9, 2013, 35 pages.
United States Patent and Trademark Office, "Notice of Allowance," issued in connection with U.S. Appl. No. 13/239,005, dated Nov. 27, 2013, 46 pages.
United States Patent and Trademark Office, "Notice of Allowance," issued in connection with U.S. Appl. No. 13/513,148, dated Nov. 5, 2012, 27 pages.
United States Patent and Trademark Office, "Notice of Allowance," issued in connection with U.S. Appl. No. 13/691,175, dated Mar. 9, 2014, 6 pages.
United States Patent and Trademark Office, "Non-Final Office Action," issued in connection with U.S. Appl. No. 13/756,493, dated Jan. 17, 2014, 32 pages.
United States Patent and Trademark Office, "Notice of Allowance and Fee(s) Due," issued in connection with U.S. Appl. No. 13/690,915, dated Apr. 9, 2014, 28 pages.
United States Patent and Trademark Office, "Notice of Allowance," issued in connection with U.S. Appl. No. 13/691,175, dated Jan. 27, 2014, 15 pages.
Patent Cooperation Treaty, "International Search Report," issued in connection with Application No. PCT/US2014/068621, dated Feb. 27, 2015, 3 pages.
Patent Cooperation Treaty, "Written Opinion," issued in connection with Application No. PCT/US2014/068621, dated Feb. 27, 2015, 7 pages.
Canadian Intellectual Property Office, "Examination Search Report," issued in connection with Application No. 2,810,541 dated Jan. 20, 2015, 3 pages.
The State Intellectual Property Office of China, "First Notification of Office Action," issued in connection with Application No. 201180045957.2, dated Nov. 15, 2014, 20 pages.
Japanese Patent Office, "Final Rejection," issued in connection with Japanese Patent Application No. P2014-005867 dated Aug. 26, 2014, 8 pages.
Japanese Patent Office, "Notice of Reasons for Rejection," issued in connection with Japanese Patent Application No. P2014-005867 dated Feb. 17, 2015, 6 pages.
Japanese Patent Office, "Notice of Reasons for Rejection," issued in connection with Japanese Patent Application No. P2014-005867 dated Apr. 15, 2014, 10 pages.
United States Patent and Trademark Office, "Office Action," issued in connection with U.S. Appl. No. 14/500,297, dated Jan. 5, 2015, 7 pages.
Australian Government, IP Australia, "Patent Examination Report No. 1," issued in connection with Australian Patent Application No. 2013203898, dated Nov. 27, 2014, 4 pages.
Australian Government, IP Australia, "Patent Examination Report No. 1," issued in connection with application No. 2011305429 dated Apr. 17, 2014, 4 pages.
The State Intellectual Property Office of China, "First Notification of Office Action," issued in connection with Application No. 201180061437.0, dated Mar. 7, 2014, 11 pages.
The State Intellectual Property Office of China, "Second Notification of Office Action," issued in connection with Application No. 201180061437.0, dated Nov. 15, 2014, 6 pages.
Australian Government, IP Australia, "Patent Examination Report No. 1," issued in connection with Application No. 2011374955, dated Sep. 25, 2014, 3 pages.
Canadian Intellectual Property Office, "Examination Search Report," issued in connection with Application No. 2,873,128, dated Jan. 7, 2015, 3 pages.
Patent Cooperation Treaty, "International Search Report," issued by the International Searching Authority in connection with PCT Application No. PCT/US2014/068165, dated Feb. 25, 2015, 3 pages.
Patent Cooperation Treaty, "Written Opinion of the International Searching Authority," issued by the International Searching Authority in connection with PCT Application No. PCT/US2014/06815, dated Feb. 25, 2015, 5 pages.
United States Patent and Trademark Office, "Non-Final Office Action," issued in connection with U.S. Appl. No. 13/756,493, dated Nov. 19, 2014, 13 pages.
Canadian Intellectual Property Office, Office Action, issued in connection with Canadian Patent Application No. 2,810,264, dated Nov. 27, 2014, 5 pages.
IP Australia, "Examination Report No. 2," issued in connection with application No. AU 2012231667, dated Feb. 10, 2015, 3 pages.
United States Patent and Trademark Office, "Notice of Allowance," issued in connection with U.S. Appl. No. 13/756,493, dated Mar. 17, 2015, 15 pages.
Patent Cooperation Treaty, "International Search Report," issued by the International Searching Authority in connection with PCT application No. PCT/US2014/068168, dated Mar. 2, 2015, 3 pages.
Patent Cooperation Treaty, "Written Opinion of the International Searching Authority," issued by the International Searching Authority in connection with PCT application No. PCT/US2014/068168, dated Mar. 2, 2015, 5 pages.
Patent Cooperation Treaty, "International Search Report," issued by the International Searching Authority in connection with PCT/US2011/052762, dated Aug. 22, 2012 (3 pages).
International Searching Authority, "Written Opinion," issued in connection with application No. PCT/US2011/0052762, dated Aug. 22, 2012 (4 pages).
Patent Cooperation Treaty, "International Search Report," issued in connection with Application No. PCT/US2014/035156, dated Aug. 25, 2014, 5 pages.
Patent Cooperation Treaty, "Written Opinion," issued in connection with Application No. PCT/US2014/035156, dated Aug. 25, 2014, 5 pages.
European Patent Office, "Extended European Search Report," issued in connection with application No. EP 12760524.4, dated Aug. 18, 2014, 8 pages.
Japanese Patent Office, "Office Action" with English translation, issued in connection with application No. JP 2013-544887, dated Aug. 12, 2014, 21 pages.
United States Patent and Trademark Office, "Non-Final Office Action," issued in connection with U.S. Appl. No. 13/396,071, dated May 9, 2014, 35 pages.
United States Patent and Trademark Office, "Non-Final Office Action," issued in connection with U.S. Appl. No. 13/209,292, dated Apr. 8, 2014, 15 pages.
Patent Cooperation Treaty, "International Search Report," issued by the International Searching Authority in connection with PCT/US2013/057045, dated Dec. 27, 2013 (3 pages).

(56) References Cited

OTHER PUBLICATIONS

International Searching Authority, "Written Opinion," issued in connection with application No. PCT/US2013/057045, dated Dec. 27, 2013 (5 pages).
United States Patent and Trademark Office, "Notice of Allowance," issued in connection with U.S. Appl. No. 13/756,493, dated May 20, 2014, 32 pages.
Braverman, Samantha, "Are the Online Marketing Efforts of TV Shows and Programs Worthwhile?" Mar. 30, 2011 (5 pages).
Danaher, Peter J., Journal of Marketing Research, vol. XXVIII, "A Canonical Expansion Model for Multivariate Media Exposure Distributions: a Generalization of the 'Duplication of Viewing Law,'" Aug. 1991 (7 pages).
Enoch, Glenn and Johnson, Kelly. Journal of Advertising Research, "Cracking the Cross-Media Code: How to Use Single-Source Measures to Examine Media Cannibalization and Convergence," Jun. 2010 (13 pages).
Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).
Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).
Nielsen, "How Teens Use Media: a Nielsen Report on the Myths and Realities of Teem Media Trends," Jun. 2009 (17 pages).
Arbitron Inc., Edison Research, "The Infinite Dial 2011: Navigating Digital Platforms," 2011 (83 pages).
Rust, Roland T., Klompmaker, Jay E., Journal for Advertising, vol. 10, No. 3, "A Comparative Study of Television Duplication Models," 1981 (6 pages).
Hothorn et al. "Unbiased Recursive Partitioning: a Conditional Inference Framework," Journal of Computational and Geographical Statistics, vol. 15, No. 3, 2006, pp. 651-674 (21 pages).
Edwards, Jim. "Apple Wants More Advertisers to Use Its iPhone Tracking System." Business Insider. Jun. 13, 2013. Retrieved from http://www.businessinsider.com/apples-idfa-and-ifa-tracking-system-2013-6 (2 pages).
Facebook for Business. "Measuring Conversions on Facebook, Across Devices and in Mobile Apps" Aug. 14, 2014. Retrieved from https://www.facebook.com/business/news/cross-device-measurement (3 pages).
Patent Cooperation Treaty, "International Search Report and Written Opinion of the International Searching Authority," issued in connection with Application No. PCT/US2014/031342, dated Jul. 28, 2014, 13 pages.
Patent Cooperation Treaty, "International Search Report and Written Opinion of the International Searching Authority," issued in connection with Application No. PCT/US2014/034389, dated Sep. 5, 2014, 15 pages.
Patent Cooperation Treaty, "International Search Report and Written Opinion," issued in connection with Application No. PCT/US2014/035683, dated Sep. 12, 2014, 13 pages.
Patent Cooperation Treaty, "International Search Report and Written Opinion," issued in connection with Application No. PCT/US2014/037064, dated Sep. 12, 2014, 9 pages.
United States Patent and Trademark Office, "Notice of Allowance," issued in connection with U.S. Appl. No. 13/396,071, dated Oct. 24, 2014, 31 pages.
Canadian Intellectual Property Office, "Office Action," issued in connection with Canadian Patent Application No. 2,819,268, dated Nov. 24, 2014 (4 pages).
Patent Cooperation Treaty, "International Search Report and Written Opinion," issued in connection with Application No. PCT/US2014/050551, dated Nov. 24, 2014, 11 pages.
Patent Cooperation Treaty, "International Preliminary Report on Patentability," issued in connection with Application No. PCT/US2013/045211, dated Dec. 16, 2014, 8 pages.
IP Australia, "Patent Examination Report No. 1," issued in connection with Application No. 2013204865, dated Dec. 22, 2014, 3 pages.
United States Patent and Trademark Office, "Non-Final Office Action," issued in connection with U.S. Appl. No. 13/915,381, dated Jan. 30, 2015, 51 pages.
Patent Cooperation Treaty, "International Preliminary Report on Patentability," issued in connection with Application No. PCT/US2013/057045, dated Mar. 3, 2015, 1 page.
Patent Cooperation Treaty, "International Search Report," issued in connection with Application No. PCT/US2014/068623, dated Mar. 23, 2015, 3 pages.
Patent Cooperation Treaty, "Written Opinion," issued in connection with Application No. PCT/US2014/068623, dated Mar. 23, 2015, 8 pages.
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
European Patent Office, "Extended European Search Report," issued in connection with application No. EP 14004028.8, dated Apr. 9, 2015, 7 pages.
United States Patent and Trademark Office, "Non-Final Office Action," issued in connection with U.S. Appl. No. 14/025,575, dated Apr. 16, 2015, 72 pages.
The State Intellectual Property Office of China, "First Notification of Office Action," issued in connection with application No. CN 201280003504.8, dated Apr. 1, 2015, with English translation, 17 pages.
IP Australia, "Patent Examination Report No. 1," issued in connection with Application No. 2014260163, dated Apr. 21, 2015, 3 pages.
United States Patent and Trademark Office, "Notice of Allowance," issued in connection with U.S. Appl. No. 14/500,297, dated May 21, 2015, (31 pages).
IP Australia, "Patent Examination Report No. 1," issued in connection with Application No. 2014262739, dated May 29, 2015, 4 pages.
United States Patent and Trademark Office, "Notice of Allowance," issued in connection with U.S. Appl. No. 13/915,381, dated Jun. 8, 2015, 44 pages.
United States Patent and Trademark Office, "Non-Final Office Action," issued in connection with U.S. Appl. No. 13/404,984, dated May 20, 2015, (27 pages).
IP Australia, "Patent Examination Report No. 1," issued in connection with Application No. 2011349435, dated Nov. 2, 2014 (3 pages).
Japanese Patent Office, "Office Action," issued in connection with Japanese Patent Application No. 2013543286, dated Aug. 26, 2014 (5 pages).
United States Patent and Trademark Office, "Notice of Allowance," issued in connection with U.S. Appl. No. 13/995,864, dated Oct. 28, 2014 (39 pages).
Goerg et al., "How Many Millennials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.
United States Patent and Trademark Office, "Non-Final Office Action," issued in connection with U.S. Appl. No. 14/014,044, dated Jul. 2, 2015, 69 pages.
United States Patent and Trademark Office, "Non-Final Office Action," issued in connection with U.S. Appl. No. 14/463,309, dated Aug. 5, 2015, 62 pages.
United States Patent and Trademark Office, "Non-Final Office Action," issued in connection with U.S. Appl. No. 14/025,567, dated Aug. 6, 2015, 59 pages.
Japanese Patent Office, "Notice of Reasons for Rejection," issued in connection with Japanese Patent Application No. P2015-078539 dated Jul. 14, 2015 (6 pages).

(56) References Cited

OTHER PUBLICATIONS

IP Australia, "Patent Examination Report No. 1," issued in connection with Australian Patent Application No. 2013204354, dated Nov. 17, 2014, 3 pages.

United States Patent and Trademark Office, "Final Office Action," issued in connection with U.S. Appl. No. 14/025,575, dated Aug. 17, 2015, 78 pages.

Rainier, Maria, "Why Businesses Should Use Google Plus," The Social Media Guide, thesocialmediaguide.com/social_media/why-businesses-should-use-goo- - gle-plus, retrieved on May 7, 2013 (9 pages).

Taboga, Marco, "Linear combinations of normal random variables", from "Lectures on probability and statistics," Nov. 23, 2015, <http://www.statlect.com/normal_distribution_linear_combinations.htm &g- - t; (4 pages).

Whiting et al., "Creating an iPhone Application for Collecting Continuous ABC Data," Journal of Applied Behavior Analysis, vol. 45, No. 3, Fall 2012, p. 946-656 (14 pages).

Liu et al., "Socialize Spontaneously with Mobile Application," INFOCOM 2012, Orlando, FL, Mar. 25-30, 2012, p. 1942-1950 (9 pages).

Evensen et al., "AdScorer: an Event-Based System for Near Real-Time Impact Analysis of Television Advertisements," DEBS'12, Jul. 16-20, 2012, p. 85-94 (10 pages).

Dhillon et al., "Leveraging Consumer Sensing Devices for Telehealth," CHINZ 2012, Dundin, New Zealand, Jul. 2-3, 2012, p. 29-35 (7 pages).

Buyya et al., "Cloudbus Toolkit for Market-Oriented Computing," CloudCom 2009, LNCS 5931, Springer-Verlag, Berlin, Germany, 2009, p. 24-44 (21 pages).

United States Patent and Trademark Office, "Non-Final Office Action," issued in connection with U.S. Appl. No. 14/473,654, dated May 17, 2017, 16 pages.

Mexican Intellectual Property Office, "2nd Office Action," issued in connection with Mexican Patent Application No. MX/a/2014/014747, dated Jun. 23, 2017, 6 pages.

United States Patent and Trademark Office, "Notice of Allowance," issued in connection with U.S. Appl. No. 14/014,050, on Jul. 25, 2018, 9 pages.

United States Patent and Trademark Office, "Final Office Action," issued in connection with U.S. Appl. No. 14/014,050, dated Oct. 30, 2017, 12 pages.

United States Patent and Trademark Office, "Non-final Office Action," issued in connection with U.S. Appl. No. 14/014,050, dated May 9, 2017, 15 pages.

United States Patent and Trademark Office, "Non-final Office Action," issued in connection with U.S. Appl. No. 14/014,050, dated Sep. 28, 2016, 11 pages.

United States Patent and Trademark Office, "Non-final Office Action," issued in connection with U.S. Appl. No. 14/014,050, dated Nov. 23, 2015, 11 pages.

United States Patent and Trademark Office, "Non-final Office Action," issued in connection with U.S. Appl. No. 14/014,050, dated May 28, 2015, 4 pages.

United States Patent and Trademark Office, "Non-final Office Action," issued in connection with U.S. Appl. No. 14/014,050, dated Sep. 12, 2014, 10 pages.

United States Patent and Trademark Office, "Advisory Action," issued in connection with U.S. Appl. No. 14/014,050, dated Jan. 26, 2018, 3 pages.

Patent Cooperation Treaty, "International Preliminary Report on Patentability," issued in connection with Application No. PCT/US2014/031342, dated Jan. 12, 2016, 9 pages.

United States Patent and Trademark Office, "Non-Final Office Action," issued in connection with U.S. Appl. No. 16/049,478, dated Nov. 7, 2019, 10 pages.

United States Patent and Trademark Office, "Final Office Action," issued in connection with U.S. Appl. No. 16/049,478, dated Apr. 14, 2020, 8 pages.

United States Patent and Trademark Office, "Notice of Allowance and Fee(s) Due," issued in connection with U.S. Appl. No. 16/049,478, dated Aug. 6, 2020, 9 pages.

United States Patent and Trademark Office, "Non-Final Office Action," issued in connection with U.S. Appl. No. 16/049,478, dated Feb. 9, 2021, 6 pages.

United States Patent and Trademark Office, " Notice of Allowance and Fee(s) Due," issued in connection with U.S. Appl. No. 16/049,478, dated Aug. 17, 2021, 9 pages.

METHODS AND APPARATUS TO COLLECT DISTRIBUTED USER INFORMATION FOR MEDIA IMPRESSIONS

RELATED APPLICATIONS

This patent arises from a continuation of U.S. patent application Ser. No. 16/049,478, filed on Jul. 30, 2018, which claims priority to U.S. patent application Ser. No. 14/014,050, filed on Aug. 29, 2013, now U.S. Pat. No. 10,068,246, which claims priority to U.S. Provisional Patent Application Ser. No. 61/845,748, filed on Jul. 12, 2013. U.S. patent application Ser. No. 16/049,478, U.S. patent application Ser. No. 14/014,050, and U.S. Provisional Patent Application Ser. No. 61/845,748 are incorporated herein by reference in their entireties. Priority to U.S. patent application Ser. No. 16/049,478, U.S. patent application Ser. No. 14/014,050, and U.S. Provisional Patent Application Ser. No. 61/845,748 is hereby claimed.

FIELD OF THE DISCLOSURE

The present disclosure relates generally to monitoring media and, more particularly, to methods and apparatus to collect distributed user information for media impressions.

DETAILED DESCRIPTION

Figure 1:
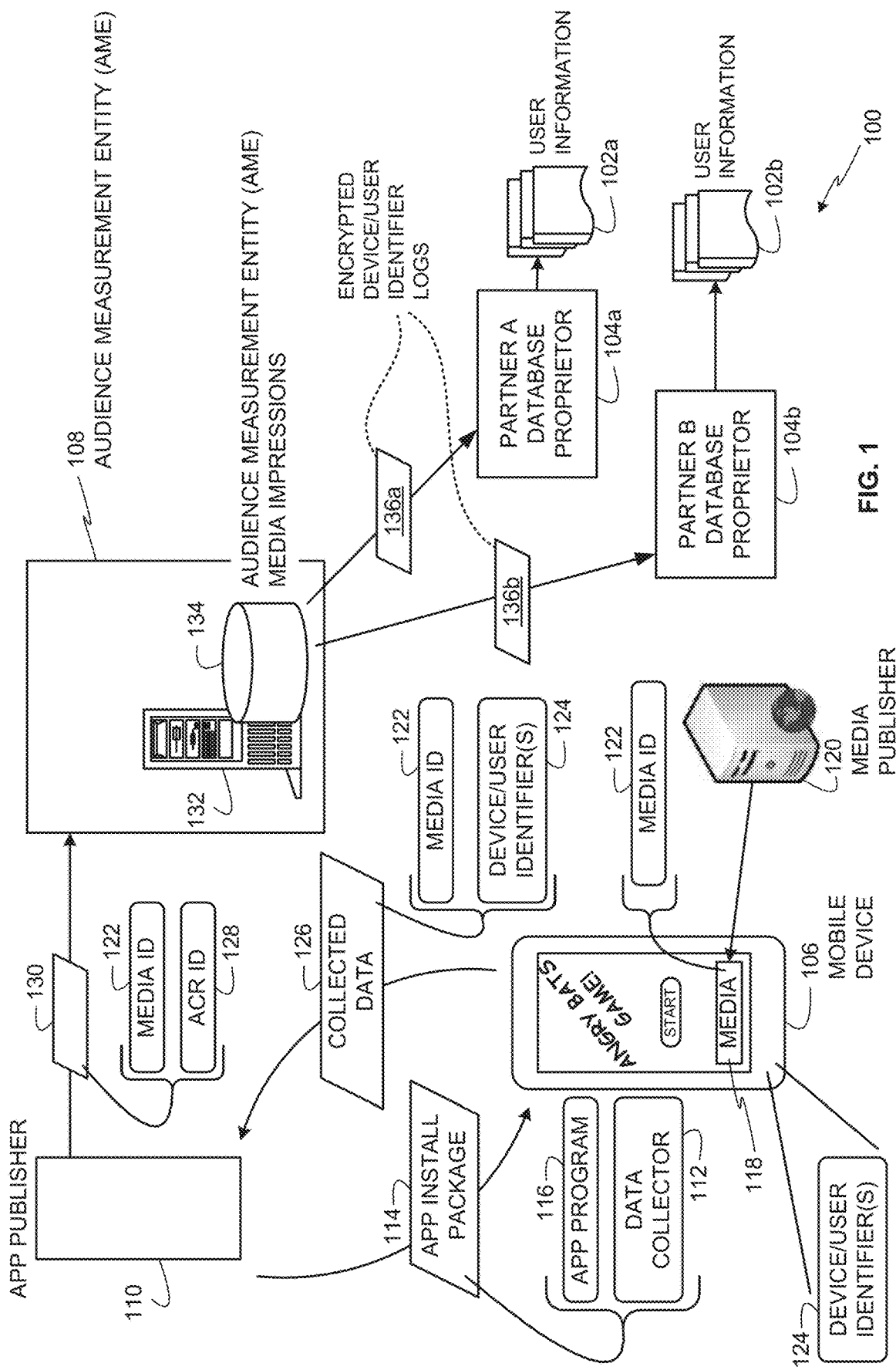
FIG. 1 depicts an example system to collect user information from distributed database proprietors for associating with impressions of media presented at mobile devices.

Techniques for monitoring user access to Internet resources such as web pages, advertisements and/or other content has evolved significantly over the years. At one point in the past, such monitoring was done primarily through server logs. In particular, entities serving media on the Internet would log the number of requests received for their media (e.g., content and/or advertisements) at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein an Internet resource (e.g., media) to be tracked is tagged with beacon instructions. In particular, monitoring instructions are associated with the HTML of the resource to be tracked. When a client requests the resource, both the resource and the beacon instructions are downloaded to the client. The beacon instructions are, thus, executed whenever the resource (e.g., an advertisement, content, etc.) is accessed, be it from a server or from a cache.

The beacon instructions cause monitoring data reflecting information about the access to the media to be sent from the client that downloaded the media to a monitoring entity. Typically, the monitoring entity is an audience measurement entity that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the audience measurement company irrespective of whether the client is a panelist of the audience measurement company.

It is useful, however, to link demographics and/or other user information to the monitoring information. To address this issue, the audience measurement company establishes a panel of users who have agreed to provide their demographic information and to have their Internet browsing activities monitored. When an individual joins the panel, he/she provides detailed information concerning his/her identity and demographics (e.g., gender, race, income, home location, occupation, etc.) to the audience measurement company. The audience measurement entity sets a cookie on the panelist computer that enables the audience measurement entity to identify the panelist whenever the panelist accesses a tagged Internet resources (e.g., content or advertisement) and, thus, sends monitoring information to the audience measurement entity.

Since most of the clients providing monitoring information from the tagged resources are not panelists and, thus, are unknown to the audience measurement entity, it is necessary to use statistical methods to impute demographic information based on the data collected for panelists to the larger population of users providing data for the tagged resource. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so. In addition, apps that run on mobile device platforms do not use cookies in the same way as web browsers. Although apps do present media that is worthy of impression tracking, prior techniques that use cookie-based approaches for tracking such media impressions are unusable in the app environment context.

In view of the foregoing, an audience measurement company would like to leverage the existing databases of database proprietors to collect more extensive Internet usage and demographic data and/or user data for associating with media impressions tracked on devices (e.g., smartphones, tablets, etc.) that execute apps that do not employ cookies used in web browsers. However, the audience measurement entity is faced with several problems in accomplishing this end. For example, a problem is presented as to how to access the data of the database proprietors without compromising the privacy of the subscribers, the panelists, or the proprietors of the tracked media. Another problem is how to access this data given the technical restrictions imposed by app software platforms of mobile devices that do not employ cookies.

Example methods, apparatus and/or articles of manufacture disclosed herein enable tracking media impressions for media presented by mobile device apps that execute on mobile devices, without needing to rely on cookies to track such media impressions. In this manner, an audience measurement entity (AME) can track media impressions on mobile devices that do not accept cookies. Apps that do not employ cookies have higher usage rates than web browsers that do employ cookies on some such devices. Examples disclosed herein also protect privacies of users by encrypting identification information in such a way that personally-identifying information is not revealed to the audience measurement entity (AME). Examples disclosed herein accomplish this by using an application campaign rating (ACR) identifier (ID) that includes one or more encrypted device and/or user identifier(s) (i.e., device/user identifier(s)) retrieved from a mobile device. The one or more encrypted device/user identifier(s) can then be used to retrieve user information for a user of the mobile device by sending the one or more encrypted device/user identifier(s) to one or more corresponding database proprietors that store user information for its registered users. In the illustrated examples, to protect users' privacies, the AME does not have keys to decrypt the encrypted device/user identifiers, and each database proprietor has only its respective key(s) useable to decrypt only device/user identifier(s) pertaining to its services (e.g., wireless carrier services, social networking services, email services, mobile phone ecosystem app or media services, etc.). In this manner, personally-identifying information for particular services will not be revealed to the AME or to just any database proprietor, but only to the database proprietor that provides the particular service.

In examples disclosed herein, when an audience measurement entity receives an ACR ID including one or more encrypted device/user identifier(s), the audience measurement entity requests user information from one or more partnered database proprietors for the encrypted device/user identifier(s). In this manner, the partnered database proprietor(s) can provide user information to the audience measurement entity for the encrypted device/user identifier(s), to facilitate associating the user information with one or more media ID's of media presented by app(s) on one or more mobile device(s). Because the identification of users or client mobile devices is done with reference to enormous databases of users far beyond the quantity of persons present in a conventional audience measurement panel, the data developed from this process is extremely accurate, reliable and detailed.

In some examples, by agreeing to participate in concerted audience measurement efforts, the partnered database proprietors are provided with audience user information and impression information collected by other partnered database proprietors. In this manner, partnered database proprietors can supplement their own audience impression metrics with information provided by other partnered database proprietors.

Example methods, apparatus, and articles of manufacture disclosed herein can be used to determine media impressions (e.g., content impressions, and/or advertisement impressions), using user information, which is distributed across different databases (e.g., different website owners, service providers, etc.) on the Internet and impression data. Not only do example methods, apparatus, and articles of manufacture disclosed herein enable more accurate correlation of Internet media impressions to user demographic information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media impression tracking capabilities of the audience measurement entity and the use of databases of non-AME entities such as social media and/or other websites to create an enormous, demographically accurate panel that results in accurate, reliable measurements of impressions to Internet media such as advertising and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media impressions to those panelists and different demographic markets. Unlike traditional techniques in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc.

Example methods, apparatus, and/or articles of manufacture disclosed herein may be implemented by an audience measurement entity (e.g., any entity interested in measuring or tracking audience impressions to advertisements, content, and/or any other media or Internet resources) in cooperation with any number of database proprietors such as online web services providers to develop online media impression metrics. Such database proprietors/online web services providers may be wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

In some examples, to increase the likelihood that measured viewership is accurately attributed to the correct demographics, example methods, apparatus, and/or articles of manufacture disclosed herein use user information located in the audience measurement entity's records as well as user information located at one or more database proprietors (e.g., web service providers) that maintain records or profiles of users having accounts therewith. In this manner, example methods, apparatus, and/or articles of manufacture disclosed herein may be used to supplement user information maintained by a ratings entity (e.g., an audience measurement company such as The Nielsen Company of Schaumburg, Ill., United States of America, that collects media impression measurements, demographics, and/or other user information) with user information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users. Online web service providers such as wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), etc. (collectively and individually referred to herein as online database proprietors) maintain detailed demographic information (e.g., age, gender, geographic location, race, income level, education level, religion, etc.) collected via user registration processes. As used herein, an impression is defined to be an event in which a home or individual is exposed to the corresponding media (e.g., content and/or advertisement). Thus, an impression represents a home or an individual having been exposed to media (e.g., an advertisement, content, a group of advertisements and/or a collection of content). In Internet advertising, a quantity of impressions or impression count is the total number of times media (e.g., an advertisement or advertisement campaign) has been accessed by a web population (e.g., the number of times the media is accessed as decreased by, for example, pop-up blockers and/or increased by, for example, retrieval from local cache memory). As used herein, a demographic impression is defined to be an impression that is associated with a characteristic (e.g., a demographic characteristic) of the person exposed to the media.

Example methods and apparatus disclosed herein collect location information of mobile device users, such as visits to a merchant location or other purchasing-related location. Using a mobile device identifier and/or a user identifier, example methods and apparatus disclosed herein map the location information for the mobile device user to advertisement impressions of that user on the mobile device. Example methods and apparatus disclosed herein may therefore be used to link ad exposure of a mobile device user to the user's purchasing behavior at, for example, physical storage (e.g., retailers, wholesalers, shopping clubs, etc.) to more accurately measure advertisement effectiveness.

In some examples, when a user physically visits, for instance, a physical store, a mobile device carried by the user is identified by the store proprietor (e.g., a physical store database proprietor) at the geographic location of the store. The physical store database proprietor collects device/user identifier(s) from persons who physically enter the store. For example, the retailer may collect one or more of a MAC address used for wireless communications by the mobile device, a device identifier of the mobile device, and/or a user identifier associated with the mobile device. The example audience measurement entity provides encrypted device/user identifier(s) to the example physical store database proprietor, which decrypts the encrypted device/user identifier(s) and identifies the user information in its database (e.g., based on frequent shopper card, loyalty card, and/or other registration data). The example physical store database proprietor then returns the user information to the AME. The example AME matches the user information to relevant mobile device impressions (e.g., a media identifier) to associate the mobile device impressions with visits to the physical store location. Thus, the example AME may measure the effectiveness of an advertisement at driving consumer purchasing or otherwise influencing consumer behavior by mapping media impression events to actual physical store visits.

Example methods and apparatus disclosed herein collect location-based media impression information in a manner similar to the collection of merchant location information and/or user behavior. In some examples, a collection interface is associated with a location-based media display (e.g., a billboard, an indoor or outdoor display, etc.). When a user carrying a mobile device enters an area associated with exposure to the media display, the example collection interface collects communications from the mobile device and extracts one or more unique device identifiers and/or user identifiers from the communications. Example methods and apparatus collect media impression information from a database proprietor that collects the mobile device information in association with the media display. Example methods and apparatus provide the media impression information to an audience measurement entity, which combines the media impression information with other media impression information for the same users by matching, for example, application campaign rating identifiers or other unique device and/or user identifiers. In some examples, the database proprietor is eliminated and the displayed is monitored directly by the AME.

FIG. 1 depicts an example system 100 to collect user information (e.g., user information 102a and 102b) from distributed database proprietors 104a and 104b for associating with impressions of media presented at a mobile device 106. In the illustrated example, user information or user data includes one or more of demographic data, purchase data, and/or other data indicative of user activities, behaviors, and/or preferences related to information accessed via the Internet, purchases, media accessed on electronic devices, physical locations (e.g., stores or other commercial establishments (e.g., retailers, wholesalers, specialty stores, and/or shopping clubs), restaurants, venues, etc.) visited by users, etc. Examples disclosed herein are described in connection with a mobile device, which may be a mobile phone, a mobile communication device, a tablet, a gaming device, a portable media presentation device, an MP3 player, an AC3 player, etc. However, examples disclosed herein may additionally or alternatively be implemented in connection with non-mobile devices such as internet appliances, smart televisions, internet terminals, computers, or any other device capable of presenting media received via network communications.

In the illustrated example of FIG. 1, to track media impressions on the mobile device 106, an audience measurement entity (AME) 108 partners with or cooperates with an app publisher 110 to download and install a data collector 112 on the mobile device 106. The app publisher 110 of the illustrated example may be a software app developer that develops and distributes apps to mobile devices and/or a distributor that receives apps from software app developers and distributes the apps to mobile devices. In the illustrated example, to download and install the data collector 112 on the mobile device 106, the app publisher 110 downloads an app install package 114 to the mobile device 106 when the mobile device 106 requests a purchased or free app program 116. The app publisher 110 locates the requested app program 116 and the data collector 112 in the app install package 114. The app install package 114 is sent to the mobile device 106 for installing the app program 116 and the data collector 112. In some examples, the app publisher 110 first obtains the consent of a user of the mobile device 106 to participate in a media tracking program before sending the data collector 112 for installation on the mobile device 106.

In the illustrated example, the app program 116 is a game entitled "Angry Bats" that presents media 118 received from a media publisher 120. The media 118 may be an advertisement, video, audio, text, a graphic, a web page, news, educational media, entertainment media, and/or any other type of media. In the illustrated example, a media ID 122 is provided in the media 118 to enable identifying the media 118 so that the AME 108 can credit the media 118 with media impressions when the media 118 is presented on the mobile device 106 and/or on any other device that is monitored by the AME 108.

In the illustrated example, the AME 108 provides the data collector 112 to the app publisher 110 for packaging with the app program 116 in the app install package 114. In some examples, the app publisher 110 provides the data collector 112 as a program separate from the app program 116. In other examples, the app publisher 110 compiles or otherwise includes the data collector 112 in the app program 116 rather than installing the data collector 112 as a program separate from the app program 116. An example manner of distributing data collectors across multiple apps and authorizing monitoring across the same with one authorization consent identifier is described in U.S. patent application Ser. No. 13/828,971, which is hereby incorporated by reference in its entirety. The data collector 112 of the illustrated example includes instructions (e.g., Java, java script, or any other computer language or script) that, when executed by the mobile device 106, cause the mobile device 106 to collect the media ID 122 of the media 118 presented by the app program 116 and/or the mobile device 106, and to collect one or more device/user identifier(s) 124 stored in the mobile device 106. The device/user identifier(s) 124 of the illustrated example include identifiers that can be used by corresponding ones of the partner database proprietors 104*a-b* to identify the user or users of the mobile device 106, and to locate user information 102*a-b* corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), etc. In some examples, fewer or more device/user identifier(s) 124 may be used. In addition, although only two partner database proprietors 104*a-b* are shown in FIG. 1, the AME 108 may partner with any number (e.g., 1, 2, 3, 4, or more) of partner database proprietors to collect distributed user information (e.g., the user information 102*a-b*).

In some examples, the types of device/user identifiers 124 are different from device to device depending on the type of device, the manufacturer of the device, the software installed on the device, etc. For example, a mobile device having cellular 2G, 3G, and/or 4G capabilities will have an assigned IMEI number. However, a mobile device capable of Wi-Fi, but not having cellular communication capabilities, will not have an IMEI number. As such, one or more other parameter(s) of the Wi-Fi mobile device may be used as the device/user identifiers 124. Such other parameters may include, for example, a MAC address, a login ID, and/or any other identifier or information available to the Wi-Fi capable device and that is not specific to cellular communications.

By being able to select or access multiple different types of device/user identifiers 124, the AME 108 increases the opportunities for collecting corresponding user information. For example, the AME 108 is not tied to requesting user information from a single source (e.g., only one of the partner database proprietors 104*a-b*). Instead, the AME 108 can leverage relationships with multiple partner database proprietors (e.g., the partner database proprietors 104*a-b*). If one or some partner database proprietors are unable or become unwilling to share user data, the AME 108 can request the user data from one or more other partner database proprietor(s).

In some examples, the mobile device 106 may not allow access to identification information stored in the mobile device 106. For such instances, the disclosed examples enable the AME 108 to store an AME-provided identifier (e.g., an identifier managed and tracked by the AME 108) in the mobile device 106 to track media impressions on the mobile device 106. For example, the AME 108 may provide instructions in the data collector 112 to set an AME-provided identifier in memory space accessible by and/or allocated to the app program 116, and the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the mobile device 106 for extended durations. In some examples in which the data collector 112 sets an identifier in the mobile device 106, the AME 108 may recruit a user of the mobile device 106 as a panelist, and may store user information collected from the user during a panelist registration process and/or collected by monitoring user activities/behavior via the mobile device 106 and/or any other device used by the user and monitored by the AME 108. In this manner, the AME 108 can associate user information (from panelist data stored by the AME 108) with media impressions attributed to the user on the mobile device 106 to develop media demographic impression data.

In the illustrated example, the data collector 112 sends the media ID 122 and the one or more device/user identifier(s) 124 as collected data 126 to the app publisher 110. Additionally or alternatively, the data collector 112 may be configured to send the collected data 126 to the AME and/or to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the mobile device 106). In the illustrated example, the app publisher 110 (or a collection entity) generates an ACR ID 128 that includes the device/user identifier(s) 124, and the app publisher (or a collection entity) sends the media ID 122 and the ACR ID 128 as impression data 130 to a server 132 at the AME 108. The impression data 130 of the illustrated example may include one media ID 122 and one ACR ID 128 to report a single impression of the media 118, or it may include numerous media ID's and ACR ID's based on numerous instances of collected data (e.g., the collected data 126) received from the mobile device 106 and/or other mobile devices to report multiple impressions of one or more instances of media. In the illustrated example, the server 132 of the illustrated example stores the impression data 130 in an AME media impressions store 134 (e.g., a database or other data structure). Subsequently, the AME 108 sends the device/user identifier(s) 124 from the ACR ID 128 to corresponding partner database proprietors (e.g., the partner database proprietors 104*a-b*) to receive user information (e.g., the user information 102*a-b*) corresponding to the device/user identifier(s) 124 from the partner database proprietors so that the AME 108 can associate the user information with corresponding exposure to media (e.g., the media 118) presented at mobile devices (e.g., the mobile device 106).

Although the above description describes the app publisher 110 (or other collection entity) as generating the ACR ID 128, in other examples, the data collector 112 at the mobile device 106 generates the ACR ID 128 that includes the device/user identifier(s) 124. In such examples, the data collector 112 sends the ACR ID 128 to the app publisher 110 (or other collection entity) in the collected data 126.

In the illustrated example, to protect the privacy of the user of the mobile device 106, the device/user identifier(s) 124 is/are encrypted before sending it/them to the AME 108 in the ACR ID 128. In the illustrated examples, the encryption process is performed so that neither the app publisher (110) (or other collection entity) nor the AME 108, or any other intermediate entity, can access the device/user identifier(s) 124 before they are sent to corresponding partner database proprietors (e.g., the partner database proprietors 104*a-b*). To encrypt the device/user identifier(s) 124, each partner database proprietor (e.g., the partner database proprietors 104*a-b*) for which identification information can be retrieved from the mobile device 106 is provided with one or more encryption keys specific to that partner database proprietor. In this manner, each partner database proprietor has a different set of keys so that each partner database proprietor can only recover one or more of the device/user identifier(s) 124 that pertain(s) to it. For example, a wireless service carrier can only retrieve an IMEI or MEID number, a social network site can only retrieve a login username and/or password corresponding to its social network services, etc. Copies of the one or more encryption keys can be provided to the app publisher 110 in an encryption algorithm (e.g., an SSH-1 encryption algorithm). In the illustrated example, the AME 108 provides the encryption algorithm and the encryption keys to the app publisher 110 as an encryption software package or bundle (e.g., an encryptor 202 of FIG. 2) from which the app publisher 110 cannot recover or extract the encryption keys. In this manner, the app publisher 110 is not able to access the device/user identifier(s) 124. In other examples, the app publisher 110 is able to access the device/user identifier(s) 124 if authorized by a user of the mobile device 106 (e.g., during installation of the app program 116). In such examples, the app publisher 110 may still encrypt the device/user identifier(s) 124 before sending them to the AME 108.

In the illustrated examples, the encryption algorithm is also provided with partner database proprietor identifiers along with corresponding ones of the encryption keys for each of the partner database proprietors (e.g., the partner database proprietors 104a-b). When encrypting the device/user identifier(s) 124, the encryption algorithm can append, prepend, concatenate, or otherwise associate corresponding partner database proprietor identifiers (e.g., an alphanumeric code such as FB1 for Facebook) to and/or with the encrypted device/user identifier(s) (e.g., encrypted device/user identifier(s) 208a-b of FIG. 2). The partner database proprietor identifiers are not encrypted, such that the AME 108 can access the partner database proprietor identifiers, without decrypting the encrypted device/user identifier(s), to thereby identify which of the encrypted device/user identifier(s) corresponds to which partner database proprietor. In this manner, the AME 108 can deliver the encrypted device/user identifier(s) to corresponding partner database proprietor(s) even though the AME 108 cannot decrypt the device/user identifier(s) 124.

In some examples, the app publisher 110 can run the encryption software at one of its servers or computers that receives the collected data 126 from the mobile device 106. In such examples, the media ID 122 and the device/user identifier(s) 124 are sent by the mobile device 106 as the collected data 126 via a secure connection between the encryption software running at the app publisher 110 and the mobile device 106. In this manner, the device/user identifier(s) 124 is/are not accessed by the app publisher 110 before they are encrypted using the encryption keys corresponding to the different database proprietors.

In other examples, the encryption software to encrypt the device/user identifier(s) 124 is provided in the data collector 112 so that the data collector 112 encrypts the device/user identifier(s) 124 at the mobile device 106 before sending encrypted device/user identifier(s) to the app publisher 110 (or the AME 108 or other collection entity). In some examples in which the data collector 112 encrypts the device/user identifier(s) 124, the data collector 112 also encodes the encrypted device/user identifier(s) into an ACR ID (e.g., the ACR ID 128). In such examples, the data collector 112 sends the ACR ID 128 and the media ID 122 to the app publisher 110 (or other collection entity) in the collected data 126. The example data collector 112 sends the encrypted device/user identifier(s) to the app publisher 110 (or other collection entity) based on an unencrypted partner database proprietor identifier associated with the encrypted device/user identifier(s).

After the AME 108 receives the ACR ID 128 including the device/user identifier(s) 124 in encrypted format, the AME 108 sends encrypted device/user identifier logs 136a-b to corresponding partner database proprietors (e.g., the partner database proprietors 104a-b identified via respective unencrypted partner database proprietor identifiers). In the illustrated example, each of the encrypted device/user identifier logs 136a-b may include a single encrypted device/user identifier, or it may include numerous aggregate encrypted device/user identifiers received over time from one or more mobile devices. After receiving the encrypted device/user identifier logs 136a-b, each of the partner database proprietors 104a-b decrypts its respective encrypted device/user identifiers using its copy(ies) of the encryption key(s). The partner database proprietors 104a-b then look up their users corresponding to the decrypted device/user identifiers, and collect corresponding user information 102a-b for those users for sending to the AME 108. For example, if the partner database proprietor 104a is a wireless service provider, the encrypted device/user identifier log 136a includes IMEI numbers, and the wireless service provider accesses its subscriber records to find users having IMEI numbers matching the IMEI numbers received in the encrypted device/user identifier log 136a. When the users are identified, the wireless service provider copies the users' user information to the user information 102a for delivery to the AME 108.

Figure 9:
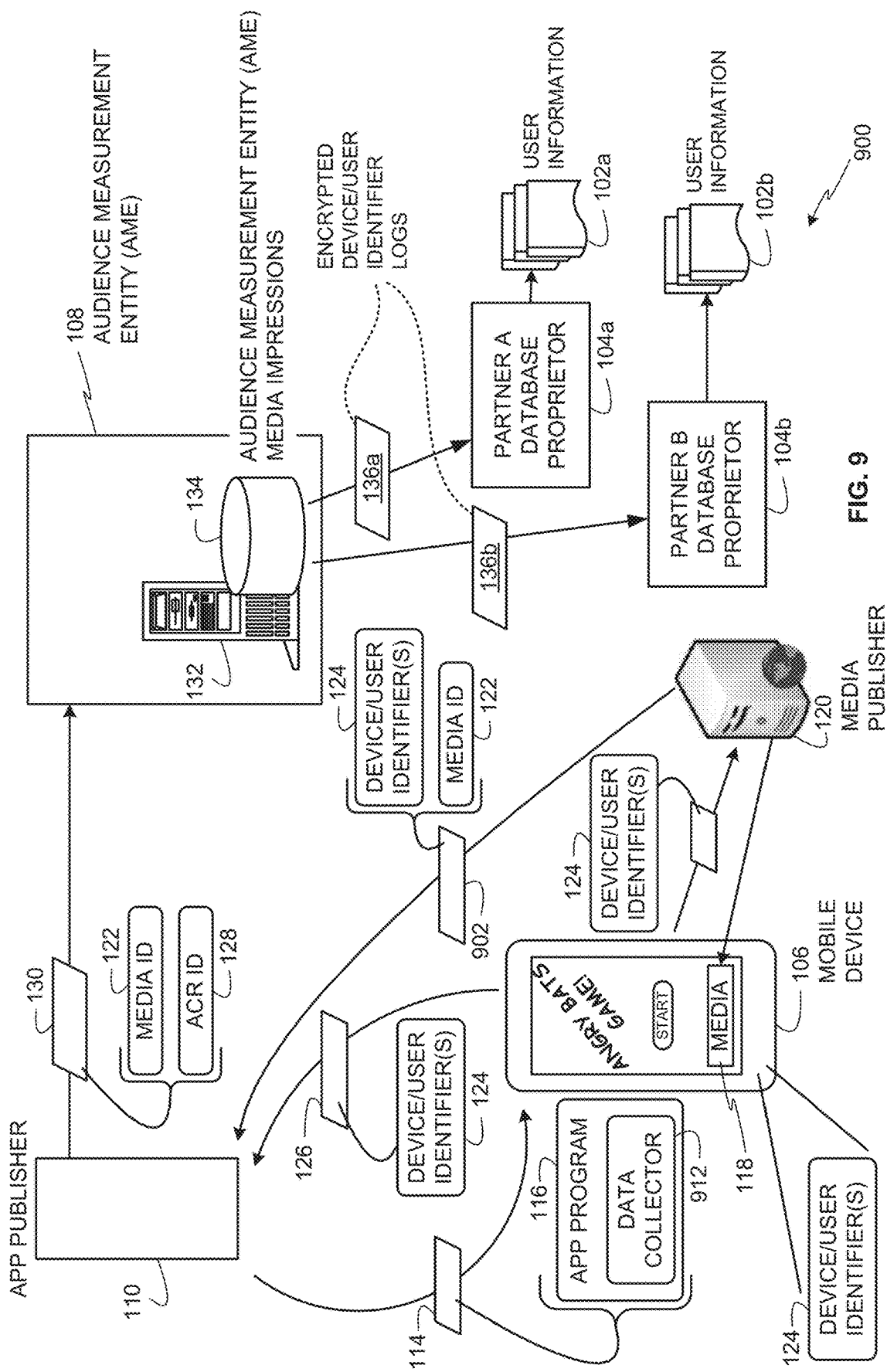
FIG. 9 depicts another example system to collect user information from distributed database proprietors for associating with impressions of media presented at mobile devices.

FIG. 9 depicts another example system 900 to collect user information (e.g., the user information 102a and 102b) from distributed database proprietors 104a and 104b for associating with exposure to media presented at the mobile device 106 to generate media demographic impression data. In the illustrated example of FIG. 9, like reference numbers are used to refer to the same or similar components as described above in connection with FIG. 1. In the illustrated example of FIG. 9, a data collector 912 is shown as being located in the app program 116. For example, the data collector 912 may include instructions coded in the app program 116 to collect data in the mobile device 106. Alternatively, the data collector 912 may be a separate program downloaded separately from the app program 116 as part of the app install package 114 from the app publisher 110.

In the illustrated example of FIG. 9, the data collector 912 is configured to collect the device/user identifier(s) 124 from the mobile device 106. The example data collector 912 sends the device/user identifier(s) 124 to the app publisher 110 in the collected data 126, and it also sends the device/user identifier(s) 124 to the media publisher 120. The data collector 912 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and sends collected data 902 to the app publisher 110 that includes the media ID 122 and the associated device/user identifier(s) 124 of the mobile device 106. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 of the mobile device 106 indicating that the media 118 was sent to the particular mobile device 106 for presentation (e.g., to generate an impression of the media 118).

In the illustrated example, the app publisher 110 matches the device/user identifier(s) 124 from the collected data 902 to the device/user identifier(s) 124 from the collected data 126 to determine that the media ID 122 corresponds to media (e.g., the media 118) presented on the mobile device 106 associated with the device/user identifier(s) 124. The app publisher 110 of the illustrated example also generates an ACR ID 128 based on the device/user identifier(s) 124 as disclosed herein. The app publisher 110 then sends the impression data 130, including the media ID 122 and the associated ACR ID 128, to the AME 108. The AME 108 can then send the encrypted device/user identifier logs 136a-b to the partner database proprietors 104a-b to request the user information 102a-b as described above in connection with FIG. 1.

Figure 10:
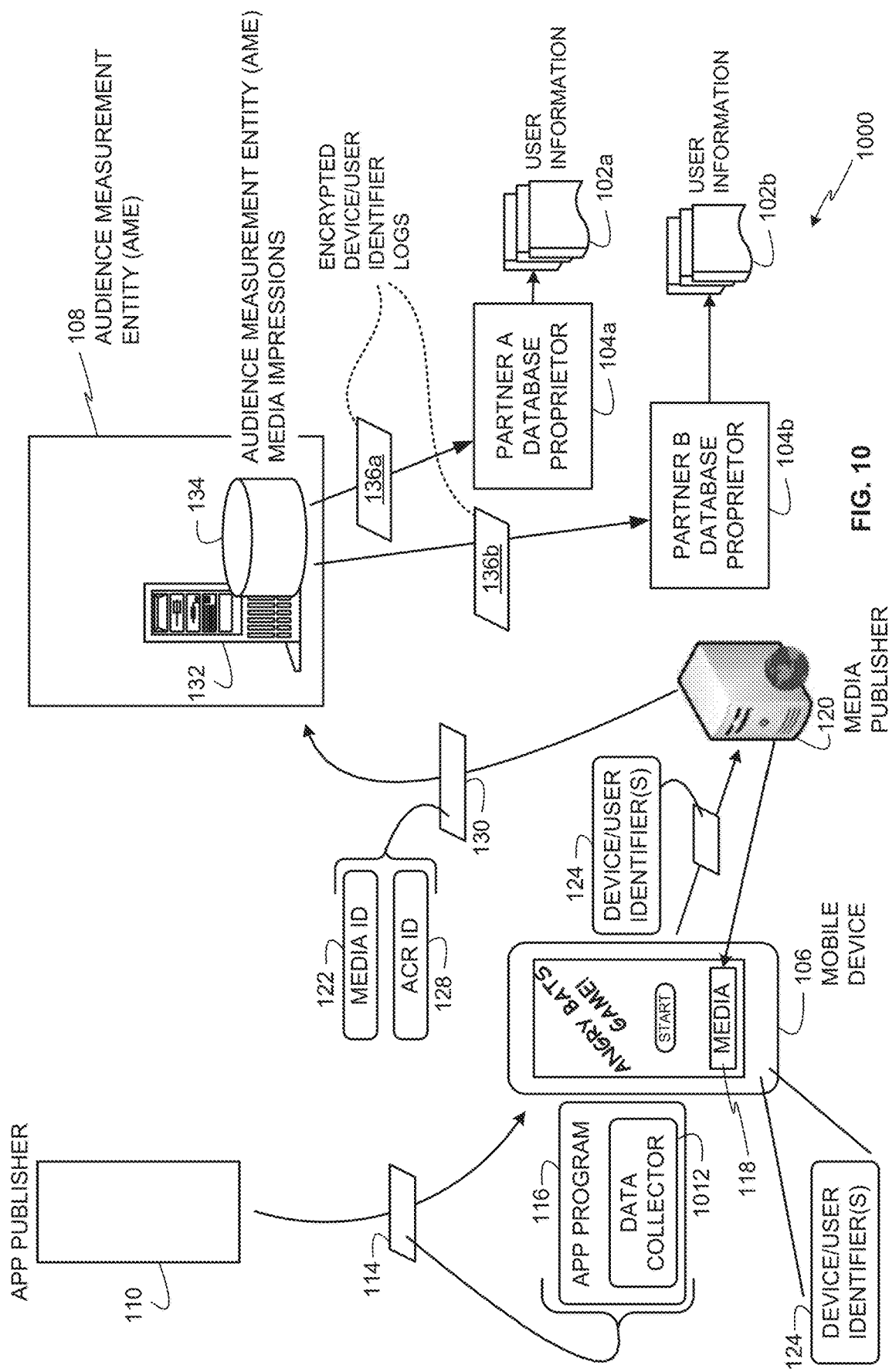
FIG. 10 depicts yet another example system to collect user information from distributed database proprietors for associating with impressions of media presented at mobile devices.

FIG. 10 depicts yet another example system 1000 to collect user information (e.g., the user information 102a and 102b) from distributed database proprietors 104a and 104b for associating with impressions of media presented at the mobile device 106. In the illustrated example of FIG. 10, like reference numbers are used to refer to the same or similar components as described above in connection with FIG. 1. In the illustrated example of FIG. 10, a data collector 1012 is shown as being located in the app program 116. For example, the data collector 1012 may include instructions coded in the app program 116 to collect data in the mobile device 106. Alternatively, the data collector 1012 may be a separate program downloaded separately from the app program 116 as part of the app install package 114 from the app publisher 110.

In the illustrated example of FIG. 10, the data collector 1012 is configured to collect the device/user identifier(s) 124 from the mobile device 106. The example data collector 1012 sends the device/user identifier(s) 124 to the media publisher 120. The data collector 1012 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and generates the ACR ID 128 based on the device/user identifier(s) 124 as disclosed herein. The media publisher 120 then sends the media impression data 130, including the media ID 122 and the ACR ID 128, to the AME 108. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 and the ACR ID 128 of the mobile device 106 indicating that the media 118 was sent to the particular mobile device 106 for presentation (e.g., to generate an impression of the media 118). In the illustrated example, after the AME 108 receives the impression data 130 from the media publisher 120, the AME 108 can then send the encrypted device/user identifier logs 136a-b to the partner database proprietors 104a-b to request the user information 102a-b as described above in connection with FIG. 1.

Although the media publisher 120 is shown separate from the app publisher 110 in FIGS. 1, 9, and 10, the app publisher 110 may implement at least some of the operations of the media publisher 120 to send the media 118 to the mobile device 106 for presentation. For example, advertisement, content, or other media providers may send media (e.g., the media 118) to the app publisher 110 for publishing to the mobile device 106 via, for example, the app program 116 when it is executing on the mobile device 106. In such examples, the app publisher 110 implements the operations described above as being performed by the media publisher 120.

In some examples, the media publisher 120 operates as a third-party media publisher relative to other traditional media publishers. In such examples, the media publisher 120 receives media from media providers and/or other traditional media publishers for publishing to electronic devices (e.g., the mobile device 106) while tracking media impressions of the published media (e.g., the media 118) and/or identities of devices to which media is published. That is, in addition to performing traditional media publisher services of publishing media to electronic devices, the media publisher 120 of the illustrated example additionally collects media impression tracking information as discussed above in connection with FIGS. 9 and 10. Thus, in some examples, the media publisher 120 is a third party that is contracted by traditional media publishers to provide media impression tracking capabilities for collecting media impressions and user information (e.g., the user information 102a-b) as disclosed herein.

In addition to associating user information (e.g., the user information 102a-b) with media IDs (e.g., the media ID 122) of published media, examples disclosed herein may additionally or alternatively be used to associate user information with other types of information collected from mobile devices representative of user interests and/or user behaviors. For example, techniques disclosed herein may also be used to monitor search terms provided by users at mobile devices, and associating those search terms with user information of users that provide the search terms. Example search terms may be provided via apps downloaded and installed on mobile devices, for searching information on the Internet and/or products at stores, websites, etc. Example systems that may be used to monitor search terms are described below in connection with FIGS. 12-14. In the illustrated examples of FIGS. 12-14, like reference numbers are used to refer to the same or similar components as described above in connection with FIG. 1.

Figure 12:
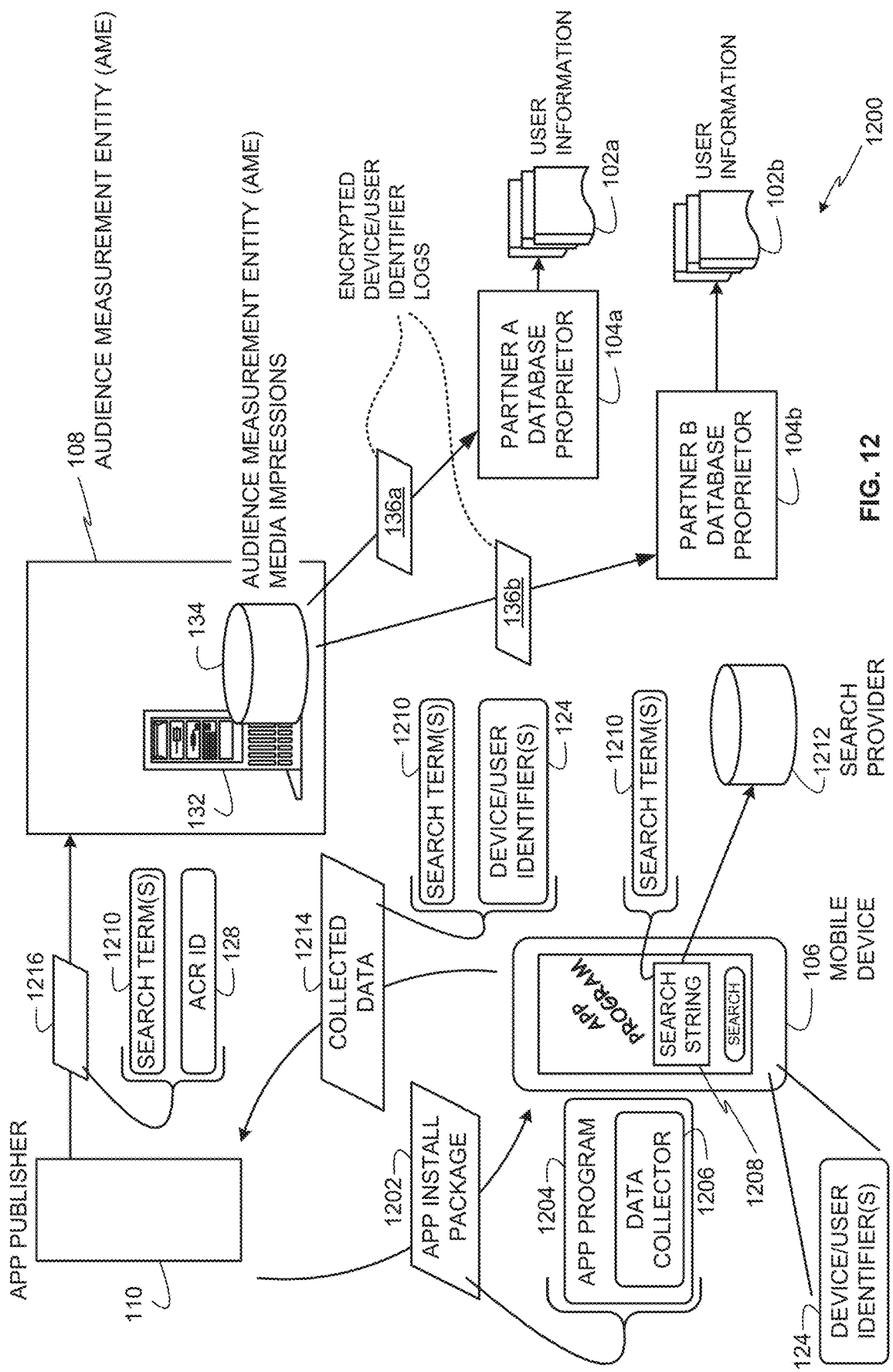
FIG. 12 illustrates an example system to collect user information from distributed database proprietors for associating with search terms provided by users at mobile devices.

FIG. 12 is an example system 1200 to collect user information (e.g., the user information 102a and 102b) from distributed database proprietors 104a-b for associating with search terms (e.g., search terms 1210) provided by users at mobile devices (e.g., the mobile device 106). In the illustrated example of FIG. 12, a data collector 1206 is shown as being located in an app program 1204 downloaded to the mobile device 106 in an app install package 1202 from the app publisher 110. For example, the data collector 1206 may include instructions coded in the app program 1204 to collect data in the mobile device 106. Alternatively, the data collector 1206 may be a separate program downloaded separately from the app program 1204 as part of the app install package 1202 from the app publisher 110.

In the illustrated example of FIG. 12, the app program 1204 provides search functionality so that users may search, for example, information on the Internet, products, services, etc. For example, when executing on the mobile device 106, the app program 1204 provides a search field 1208 for entering a search string including one or more search term(s) 1210. To provide the search functionality, the app program 1204 of the illustrated example sends the search term(s) 1210 to a search service provider 1212. In this manner, the search service provider 1212 can perform the requested search, and return search results to the app program 1204 at the mobile device 106. In the illustrated example, the search service provider 1212 may be an Internet search engine (e.g., Google, Yahoo!, Bing, etc.), an Internet portal website, a merchant, a store proprietor, a retailer, etc.

When a user provides the search term(s) 1210 in the search field 1208, the data collector 1206 sends the search term(s) 1210, and the device/user identifier(s) 124 to the app publisher 110 as collected data 1214. The app publisher 110 can then generate the ACR ID 128 based on the device/user identifier(s) 124 using example techniques disclosed herein, and send the search term(s) 1210 and the ACR ID 128 to the AME 108 as user-interest data 1216. In other examples, the data collector 1206 may be configured to send the search term(s) 1210 and the ACR ID 128 (or the device/user identifier(s) 124) as the user-interest data 1216 directly to the AME 108. The AME 108 can then send the encrypted device/user identifier logs 136*a-b* to the partner database proprietors 104*a-b* to request the user information 102*a-b* as described above in connection with FIG. 1.

Figure 13:
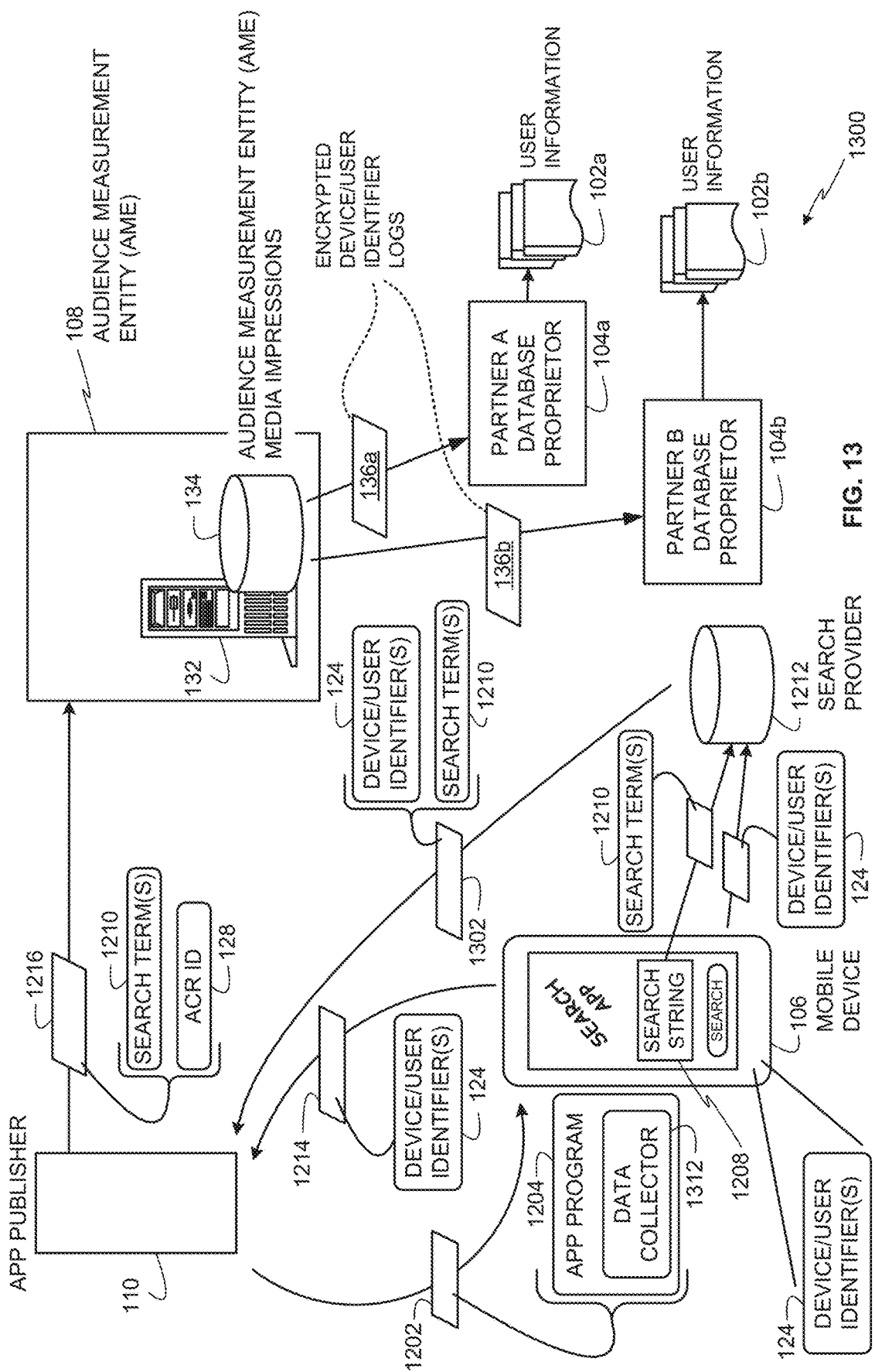
FIG. 13 depicts another example system to collect user information from distributed database proprietors for associating with search terms provided by users at mobile devices.

FIG. 13 depicts another example system 1300 to collect user information (e.g., the user information 102*a* and 102*b*) from distributed database proprietors 104*a-b* for associating with search terms (e.g., the search term(s) 1210) provided by users at mobile devices. In the illustrated example of FIG. 13, a data collector 1312 is shown as being located in the app program 1204. For example, the data collector 1312 may include instructions coded in the app program 1204 to collect data in the mobile device 106. Alternatively, the data collector 1312 may be a separate program downloaded separate from the app program 1204 as part of the app install package 1202 from the app publisher 110.

In the illustrated example of FIG. 13, the data collector 1312 is configured to collect the device/user identifier(s) 124 from the mobile device 106. The example data collector 1312 sends the device/user identifier(s) 124 to the app publisher 110 in the collected data 1214, and it also sends the device/user identifier(s) 124 to the search provider 1212. The data collector 1312 of the illustrated example does not collect the search terms 1210 from the search field 1208 at the mobile device 106 as the data collector 1206 does in the example system 1200 of FIG. 12. Instead, the search provider 1212 collects the search term(s) 1210 when received from the app program 1204. The search provider 1212 then associates the search term(s) 1210 with the device/user identifier(s) 124 of the mobile device 106, and sends collected data 1302 to the app publisher 110 that includes the search term(s) 1210 and the associated device/user identifier(s) 124 of the mobile device 106. For example, when the search provider 1212 provides services to the mobile device 106, it does so by identifying the mobile device 106 using one or more of the device/user identifier(s) 124. In this manner, the search provider 1212 can associate the search term(s) 1210 with the device/user identifier(s) 124 of the mobile device 106 indicating which searches are performed for the particular mobile device 106.

In the illustrated example, the app publisher 110 matches the device/user identifier(s) 124 from the collected data 1302 to the device/user identifier(s) 124 from the collected data 126 to determine that the search term(s) 1210 correspond to a search provided for the mobile device 106 associated with the device/user identifier(s) 124. The app publisher 110 of the illustrated example also generates an ACR ID 128 based on the device/user identifier(s) 124 as disclosed herein. The app publisher 110 then sends the user-interest data 1216, including the search term(s) 1210 and the associated ACR ID 128, to the AME 108. The AME 108 can then send the encrypted device/user identifier logs 136*a-b* to the partner database proprietors 104*a-b* to request the user information 102*a-b* as described above in connection with FIG. 1.

Figure 14:
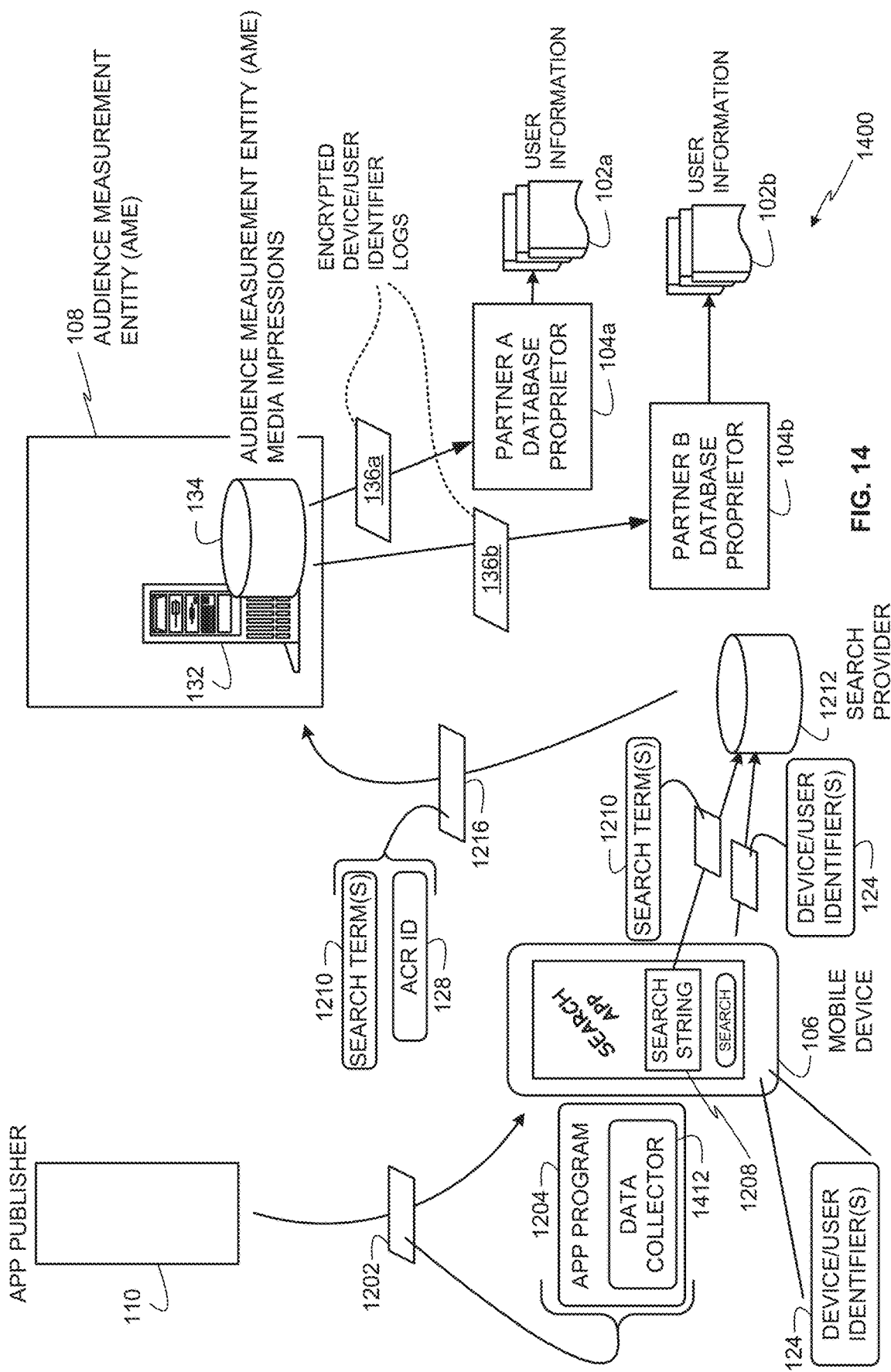
FIG. 14 depicts yet another example system to collect user information from distributed database proprietors for associating with search terms provided by users at mobile devices.

FIG. 14 depicts yet another example system 1400 to collect user information (e.g., the user information 102*a* and 102*b*) from distributed database proprietors 104*a* and 104*b* for associating with the search term(s) 1210 provided at the mobile device 106. In the illustrated example of FIG. 14, a data collector 1412 is shown as being located in the app program 1204. For example, the data collector 1412 may include instructions coded in the app program 1204 to collect data in the mobile device 106. Alternatively, the data collector 1412 may be a separate program downloaded separate from the app program 1204 as part of the app install package 1202 from the app publisher 110.

In the illustrated example of FIG. 14, the data collector 1412 is configured to collect the device/user identifier(s) 124 from the mobile device 106. The example data collector 1412 sends the device/user identifier(s) 124 to the search provider 1212. The data collector 1412 of the illustrated example does not collect the search term(s) 1210 from the search field 1208 at the mobile device 106 as the data collector 1206 does in the example system 1200 of FIG. 12. Instead, the search provider 1212 retrieves the search term(s) 1210 when received from the app program 1205 executing on the mobile device 106. The search provider 1212 then associates the search term(s) 1210 to the device/user identifier(s) 124 of the mobile device 106, and generates the ACR ID 128 based on the device/user identifier(s) 124 as disclosed herein. The search provider 1212 then sends the user-interest data 1216, including the search term(s) 1210 and the ACR ID 128, to the AME 108. For example, when the search provider 1212 provides search services to the mobile device 106, it does so by identifying the mobile device 106 using one or more of the device/user identifier(s) 124. In this manner, the search provider 1212 can associate the search term(s) 1210 with the device/user identifier(s) 124 and the ACR ID 128 of the mobile device 106 indicating that the search was performed for the particular mobile device 106. In other examples, the data collector 1412 at the mobile device 106 may be configured to send the search term(s) 1210 and the ACR ID 128 (or the device/user identifier(s) 124) as the user-interest data 1216 directly to the AME 108. In the illustrated example, after the AME 108 receives the user-interest data 1216 from the search provider 1212 (or from the mobile device 106), the AME 108 can then send the encrypted device/user identifier logs 136*a-b* to the partner database proprietors 104*a-b* to request the user information 102*a-b* as described above in connection with FIG. 1.

Although the search provider 1212 is shown separate from the app publisher 110 in FIGS. 1, 9, 10, 12, 13, and 14 the app publisher 110 may implement at least some operations of the search provider 1212 to receive the search term(s) 1210 from the mobile device 106. For example, the data collector 1412 may send the search term(s) 1210 to the app publisher 110 so that the app publisher 110 may forward the search term(s) 1210 on to a search provider. In such examples, the app publisher 110 implements at least some of the operations described above as being performed by the search provider 1212.

Figure 2:
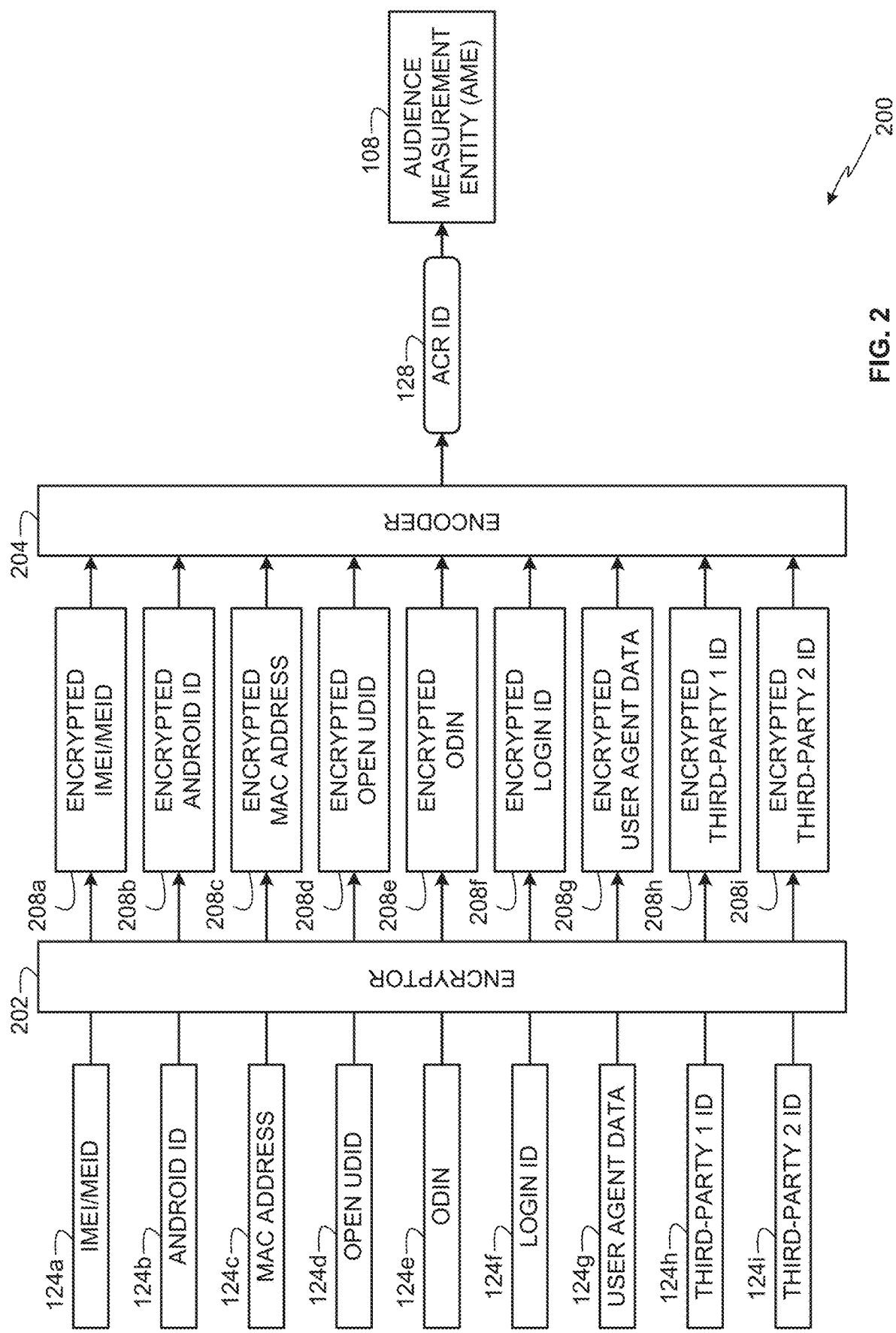
FIG. 2 depicts an example apparatus to encrypt device and/or user identifiers, and encode the encrypted device and/or user identifiers into an application campaign rating (ACR) identifier.

FIG. 2 depicts an example apparatus 200 having an encryptor 202 to encrypt device and/or user identifiers (e.g., the device/user identifier(s) 124 of FIG. 1), and having an encoder 204 to encode the encrypted device and/or user identifiers into an application campaign rating (ACR) identifier (e.g., the ACR ID 128 of FIGS. 1, 9, 10, and 12-14). The encryptor 202 of the illustrated example is provided with encryption keys and partner database proprietor identifiers corresponding to the different partner database proprietors (e.g., partner database proprietors 104a-b of FIGS. 1, 9, 10, and 12-14) for which device/user identifiers 124 (FIGS. 1, 9, 10, and 12-14) can be collected from mobile devices. In the illustrated example, device and/or user identifiers (e.g., the device/user identifier(s) 124 of FIGS. 1, 9, 10, and 12-14) include an IMEI/MEID number 124a, an Android ID 124b, a MAC address 124c, an OpenUDID 124d, an ODIN identifier 124e, a login ID 124f, user agent data 124g, a third-party 1 ID 124h, and/or a third-party 2 ID 124i. In the illustrated examples, the third-party 1 ID 124h and/or the third-party 2 ID 124i may be identifiers of targeted advertisement services, web analytics services, services that collect and store demographic information of users in association with unique identifiers (e.g., the third-party 1 ID 124h and/or the third-party 2 ID 124i) of those users. The encryptor 202 of the illustrated example uses corresponding encryption keys to encrypt the device/user identifiers 124 to corresponding encrypted device/user identifiers 208a-i. In addition, the encryptor 202 also provides (e.g., appends, prepends, or otherwise concatenates) corresponding partner database proprietor identifiers to corresponding ones of the encrypted device/user identifiers 208a-i so that the AME 108 can identify partner database proprietors (e.g., the partner database proprietors 104a-b of FIGS. 1, 9, 10, and 12-14) to which it should send corresponding ones of the encrypted device/user identifiers 208a-i (e.g., the database proprietor holding the corresponding key for the encrypted data). The encoder 204 of the illustrated example encodes the encrypted device/user identifiers 208a-i into the ACR ID 128. The ACR ID 128 is then sent to the AME 108.

The example apparatus 200 may be entirely or partially implemented at the mobile device 106 (FIGS. 1, 9, 10, and 12-14), entirely or partially implemented at the app publisher 110 (FIGS. 1, 9, 10, and 12-14) (or other collection entity), and/or entirely or partially implemented at the media publisher 120 (FIGS. 1, 9, and 10) (or search provider 1212 of FIGS. 12-14). In some examples, the encryptor 202 and the encoder 204 may both be implemented in the mobile device 106, to generate the ACR ID 128 and send the ACR ID 128 to the app publisher 110 (or other collection entity) in the collected data 126 along with the media ID 122 (and/or the search term(s) 1210). In other examples, the encryptor 202 may be implemented at the mobile device 106, and the encoder 204 may be implemented at the app publisher 110 (or other collection entity), at the media publisher 120, and/or at the search provider 1212. For example, the encryptor 202 may be provided in encryption software downloaded to the mobile device 106 as part of the data collector 112. In this manner, the encryptor 202 can encrypt the device/user identifier(s) 124 at the mobile device 106, and send the encrypted device/user identifier(s) 208a-i to the app publisher 110 (or other collection entity), to the media publisher 120, and/or to the search provider 1212. The encoder 204 can then be used at the app publisher 110 (or other collection entity), at the media publisher 120, and/or at the search provider 1212 to generate the ACR ID 128 by encoding the encrypted device/user identifier(s) 208a-i into the ACR ID 128, and the app publisher 110 (or other collection entity), the media publisher 120, and/or the search provider 1212 sends the ACR ID 128 to the AME 108 along with the media ID 122 (e.g., as the impression data 130 of FIGS. 1, 9, and 10) or the search term(s) 1210 (e.g., as the user-interest data 1216).

In other examples, both of the encryptor 202 and the encoder 204 are implemented at the app publisher 110 (or other collection entity), at the media publisher 120, and/or at the search provider 1212. In such other examples, the app publisher 110 (or other collection entity), the media publisher 120, and/or the search provider 1212 receive(s) the device/user identifier(s) 124 from the mobile device 106. The app publisher 110 (or other collection entity), the media publisher 120, and/or the search provider 1212 generate(s) the ACR ID 128 to include the encrypted device/user identifier(s) 208a-i. The app publisher 110 (or other collection entity), the media publisher 120, and/or the search provider 1212 can then send the ACR ID 128 to the AME 108 along with the media ID 122 (e.g., as the impression data 130 of FIGS. 1, 9, and 10) or the search term(s) 1210 (e.g., as the user-interest data 1216 of FIGS. 12-14).

Figure 3:
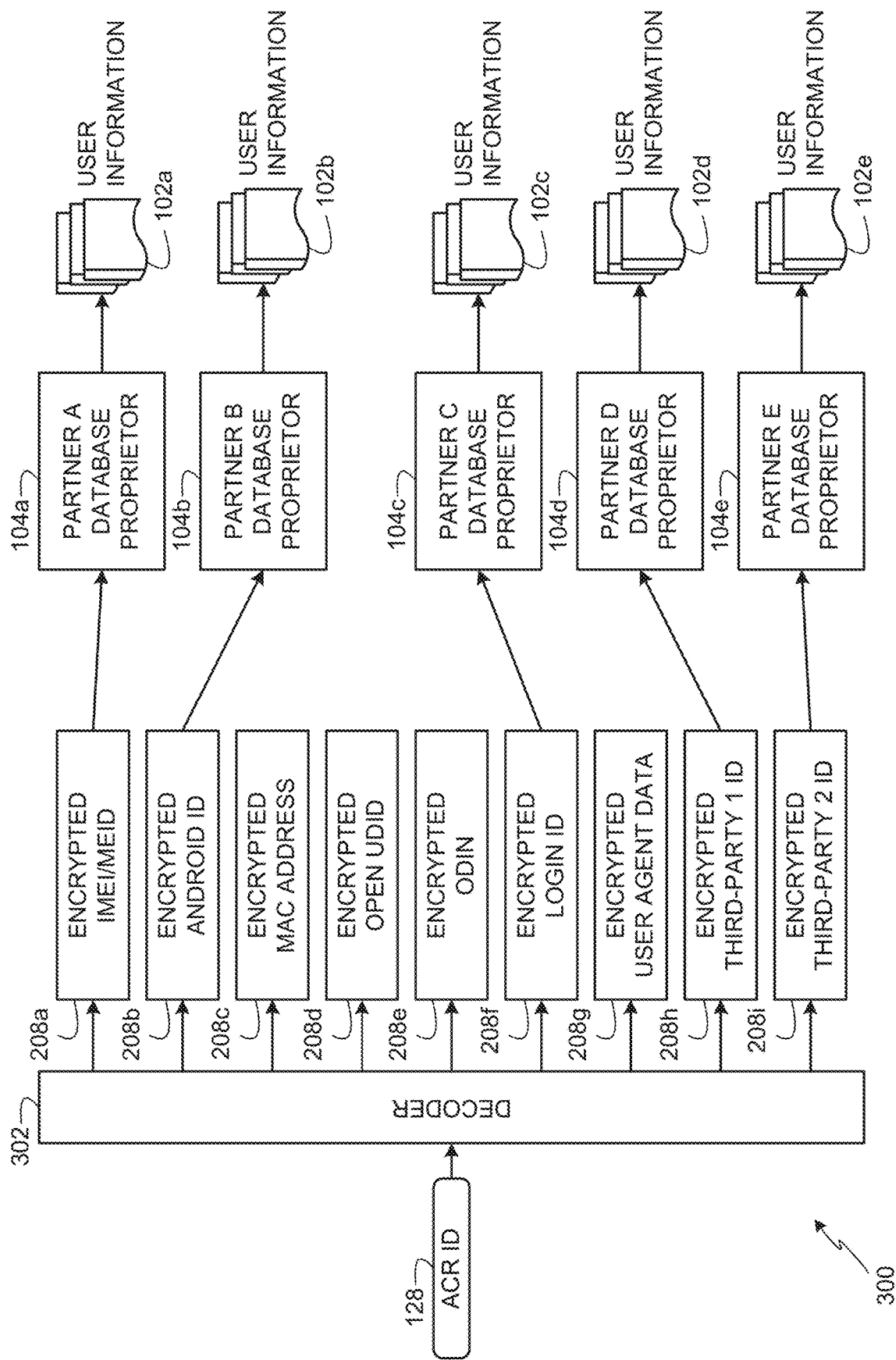
FIG. 3 depicts an example apparatus to decode encrypted device and/or user identifiers from the ACR identifier of FIG. 2, and send the encrypted device and/or user identifiers to corresponding database proprietors to request user information associated with the encrypted device and/or user identifiers.

FIG. 3 depicts an example apparatus 300 to decode encrypted device and/or user identifiers 208a-i (FIG. 2) from the ACR ID 128 of FIGS. 1, 2, 9, 10, 12, 13, and/or 14, and send one or more of the encrypted device and/or user identifiers 208a-i to corresponding partner database proprietors 104a-e to request user information 102a-e associated with the encrypted device and/or user identifiers 208a-i. The apparatus 300 of the illustrated example includes a decoder 302 to decode the encrypted device and/or user identifiers 208a-i from the ACR ID 128. In the illustrated examples, the decoder 302 is implemented at the AME 108 of FIG. 1 (e.g., at the server 132 of the AME 108). The decoder 302 of the illustrated example determines which of the partner database proprietors 104a-e correspond to which of the encrypted device/user identifiers 208a-i based on, for example, partner database proprietor identifiers provided to the encrypted device/user identifiers 208a-i by the encryptor 202 of FIG. 2. The decoder 302 then sends corresponding ones of the encrypted device and/or user identifiers 208a-i to corresponding partner database proprietors 104a-e.

Figure 4:
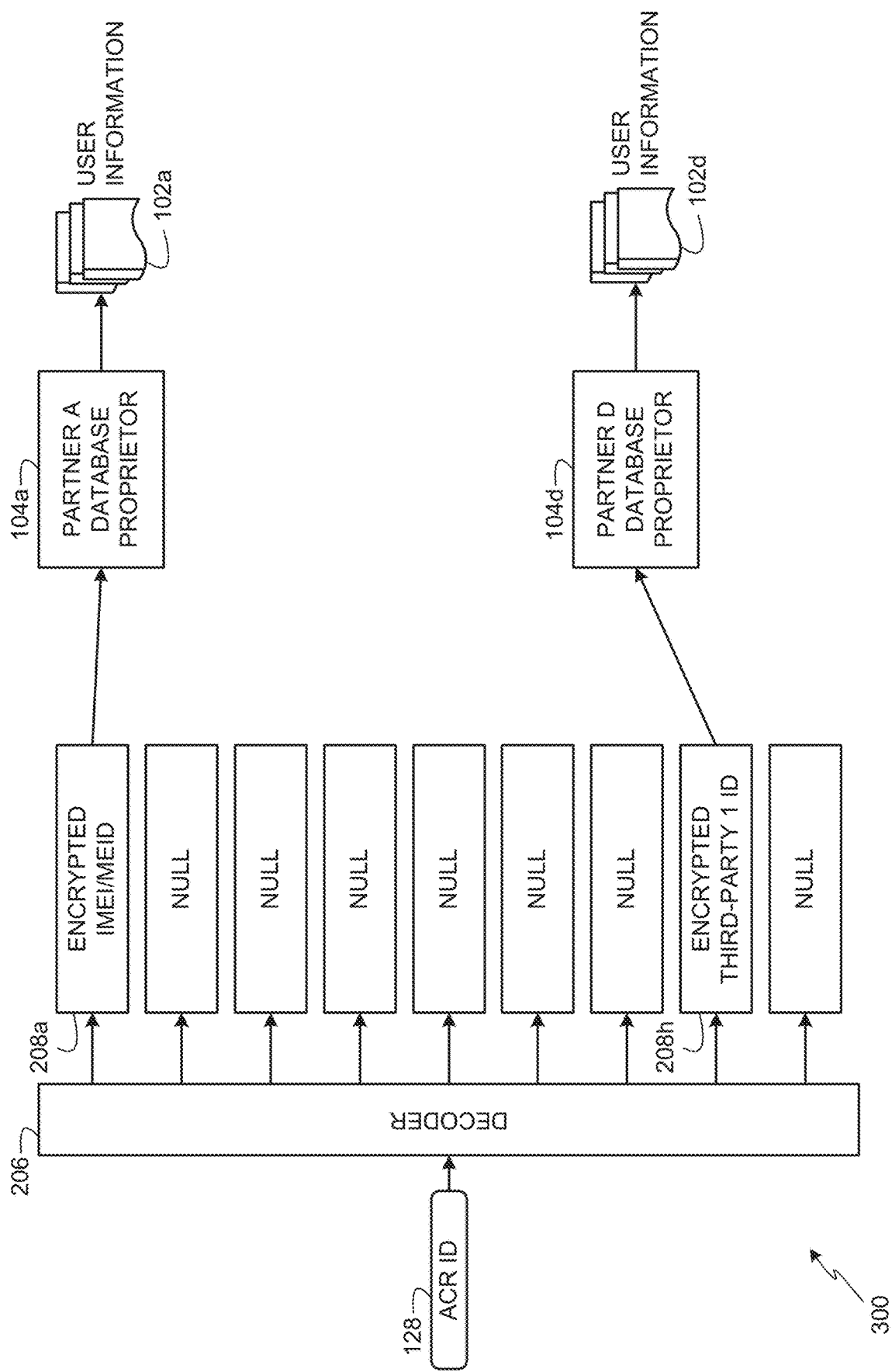
FIG. 4 depicts the example apparatus of FIG. 3 decoding an ACR identifier having some empty fields that do not contain any device and/or user identifiers.

FIG. 4 depicts the example apparatus 300 of FIG. 3 decoding the ACR ID 128 in an example in which the ACR ID 128 has some empty fields that do not contain any encrypted device and/or user identifiers. In the illustrated example of FIG. 4, the decoder 302 decodes the encrypted device and/or user identifiers 208a and 208h which are located in the ACR ID 128, sends the encrypted device and/or user identifier 208a to the corresponding partner database proprietor 104a, and sends the encrypted device and/or user identifier 208h to the corresponding partner database proprietor 104d. Thus, although nine encrypted device and/or user identifiers 208a-i are shown in FIG. 3, in some examples, fewer (e.g., less than nine) encrypted device and/or user identifiers may be located in the ACR ID 128 such as in FIG. 4. In yet other examples, more than nine encrypted device and/or user identifiers may be encoded into the ACR ID 128.

FIGS. 5, 6, 7, 11, 15, 17, 18, 22, and 23 are flow diagrams representative of machine readable instructions that may be executed to track media impressions and/or search terms and collect distributed user information for the media impressions and/or search terms using examples disclosed herein.

In the examples of FIGS. 5, 6, 7, 11, 15, 17, 18, 22, and 23, operations and processes are shown that represent machine readable instructions comprising one or more programs for execution by one or more processors such as the processor 812 shown in the example computer 800 discussed below in connection with FIG. 8. The program(s) may be embodied in software stored on a tangible computer readable medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than processor(s) such as the processor 812 and/or embodied in firmware or dedicated hardware. Further, although the example program(s) is/are disclosed herein with reference to the illustrated examples of FIGS. 5, 6, 7, 11, 15, 17, 18, 22, and 23, many other methods of implementing example disclosed herein may alternatively be used. For example, the order of execution of the processes and/or operations may be changed, and/or some of the processes and/or operations disclosed herein may be changed, eliminated, or combined.

As mentioned above, example processes and/or operations of FIGS. 5, 6, 7, 11, 15, 17, 18, 22, and 23 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes and/or operations of FIGS. 5, 6, 7, 11, 15, 17, 18, 22, and 23 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Flowcharts representative of example machine readable instructions for implementing the apparatus 300 and/or the apparatus 400 of FIGS. 2, 3, and/or 4 are shown in FIGS. 5, 6, 7, 11, 15, 17, 18, 22, and 23. In this example, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 5, 6, 7, 11, 15, 17, 18, 22, and 23, many other methods of implementing the example apparatus 300 and/or the apparatus 400 may alternatively be used. For example, the order of execution of the blocks may be changed, and/or some of the blocks described may be changed, eliminated, or combined.

As mentioned above, the example processes of FIGS. 5, 6, 7, 11, 15, 17, 18, 22, and 23 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, 7, 11, 15, 17, 18, 22, and 23 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 5:
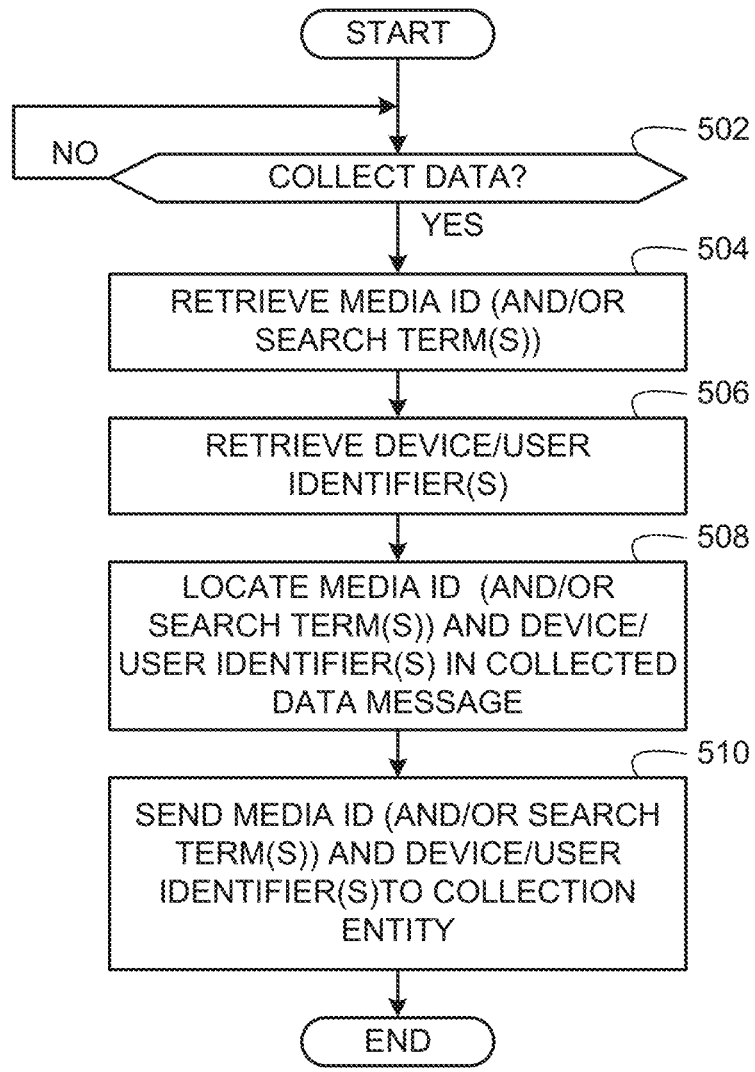
FIG. 5 is a flow diagram representative of example machine readable instructions that may be executed to collect media identifiers and device and/or user identifiers at mobile devices.

FIG. 5 is a flow diagram of an example process that may be used to collect media identifiers (e.g., the media ID 122 of FIG. 1) and device and/or user identifiers (e.g., the device/user identifiers 124 of FIGS. 1 and 2) at mobile devices (e.g., the mobile device 106 of FIG. 1). In some examples, instead of or in addition to collecting media identifiers, the example process of FIG. 5 may additionally or alternatively be used to collect search terms (e.g., the search term(s) 1210 of FIG. 12). In the illustrated example, the example process of FIG. 5 is performed at the mobile device 106. However, the example process of FIG. 5 may be performed at any other device.

Initially, the data collector 112 (FIG. 1) determines whether it should collect data (block 502). For example, the app program 116 (FIG. 1) may trigger the data collector 112 to collect data when the app program 116 presents media (e.g., the media 118 of FIG. 1) or receives one or more search term(s) (e.g., the search term(s) 1210 of FIGS. 12-14). When the data collector 112 determines at block 502 that it should collect data, the data collector 112 retrieves the media ID 122 from the media 118, and/or the search term(s) 1210 (block 504). The data collector 112 also collects one or more of the device/user identifier(s) 124 from the mobile device 106 (block 506). The data collector 112 locates the media ID 122, and/or the search term(s) 1210, and the device/user identifier(s) 124 in a collected data message (e.g., the collected data 126 of FIG. 1 and/or the collected data 1214 of FIG. 12) (block 508). The data collector 112 sends the media ID 122, and/or the search term(s) 1210, and the device/user identifier(s) 124 to a collection entity (block 510). For example, the data collector 112 sends the media ID 122, and/or the search term(s) 1210, and the device/user identifier(s) 124 as the collected data 126 (FIG. 1) and/or 1214 (FIG. 12) to the apps publisher 110 of FIG. 1. The example process of FIG. 5 then ends.

In some examples in which the encryptor 202 of FIG. 2 is provided in the data collector 112, the encryptor 202 encrypts the device/user identifier(s) 124 at block 508 to generate one or more of the encrypted device/user identifier(s) 208a-i of FIG. 2. In some such examples, the data collector 112 locates the encrypted device/user identifier(s) 208a-i and the media ID 122, and/or the search term(s) 1210, in the collected data 126 and/or 1214 at block 508. In some examples in which the encoder 204 is also provided in the data collector 112, the encoder 204 generates the ACR ID 128 of FIGS. 1-4, 9, 10, 12-14, 16, and/or 21 by encoding the encrypted device/user identifier(s) 208a-i into the ACR ID 128 at block 508. In such some examples, the data collector 112 locates the ACR ID 128 and the media ID 122, and/or the search term(s) 1210, in the collected data 126 and/or 1214 at block 508. An example process that may be used to encrypt the device/user identifier(s) 124 and encode the encrypted device/user identifiers 208a-i is described below in connection with FIG. 6.

Figure 11:
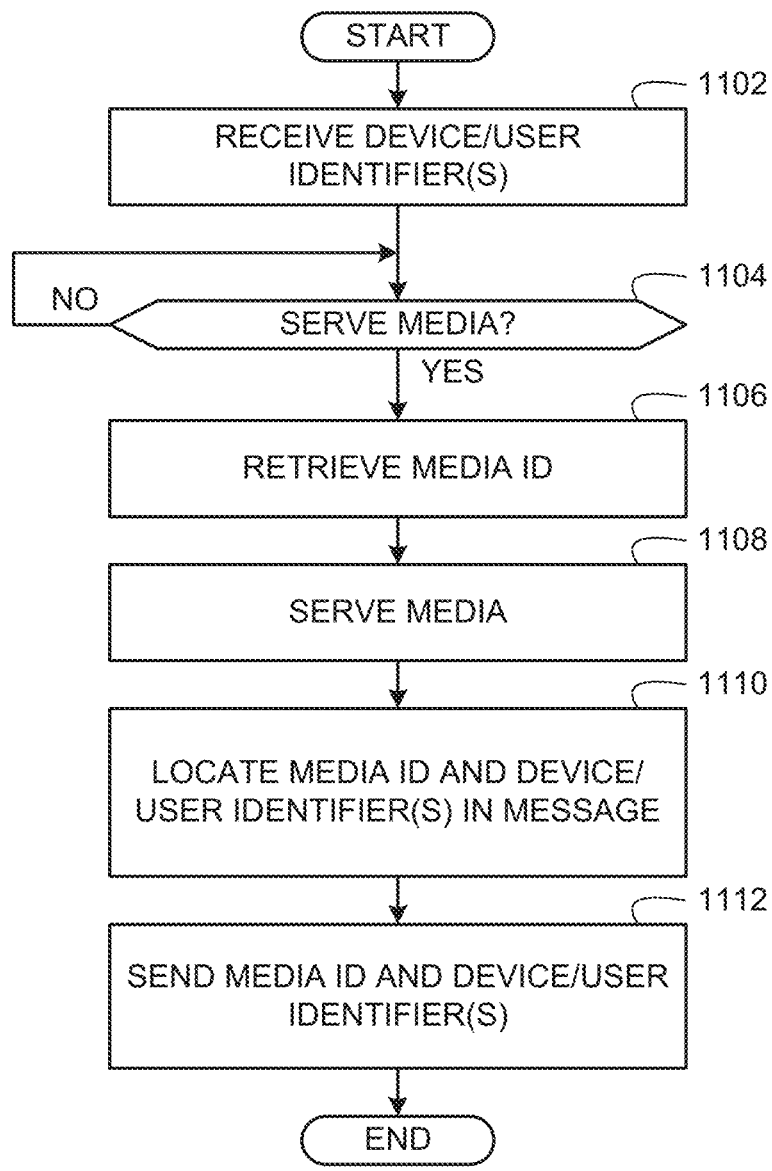
FIG. 11 is a flow diagram representative of example machine readable instructions that may be executed to collect media identifiers and device and/or user identifiers at a media publisher.

FIG. 11 is a flow diagram of an example process that may be used to collect media identifiers (e.g., the media ID 122 of FIGS. 1, 9, and 10) and device and/or user identifiers (e.g., the device/user identifier(s) 124 of FIGS. 1, 9, and 10) at a media publisher (e.g., the media publisher 120 of FIGS. 1, 9, and 10). In the illustrated example, the example process of FIG. 11 is performed by a processor system (e.g., a server) at the media publisher 120 in connection with the example system 900 of FIG. 9 and/or the example system 1000 of FIG. 10. However, the example process of FIG. 11 may be performed by any other device.

Initially, the media publisher 120 receives the device/user identifier(s) 124 (block 1102) from, for example, the data collector 912 of FIG. 9 or the data collector 1012 of FIG. 10. For example, the media publisher 120 may receive the device/user identifier(s) 124 in an HTTP header of an HTTP request from the mobile device 106. The media publisher 120 determines whether it should serve media (e.g., the media 118 of FIGS. 9 and 10) (block 1104) to, for example, the mobile device 106. For example, the media publisher 120 may receive a media serve request from the mobile device 106 that was generated by the app program 116 when executing on the mobile device 106. In the illustrated example, the media serve request is a request to serve an advertisement or other media to the mobile device 106 for presenting while the app program 116 is executing. In some examples, the media serve request is received at block 1102 when the media publisher 120 receives the device/user identifier(s) 124. For example, media publisher 120 may receive the media serve request from the mobile device 106 in the HTTP request that includes the device/user identifier(s) 124 in its HTTP header.

When the media publisher 120 determines at block 1104 that it should serve media (e.g., the media 118), the media publisher 120 retrieves the media ID 122 from the media 118 to be served (block 1106). The media publisher 120 serves the media 118 (block 1108). For example, the media publisher 120 may use one or more of the device/user identifier(s) 124 received at block 1102 to identify the mobile device 106 as a receiving device of the served media 118. The media publisher 120 locates the media ID 122 and the device/user identifier(s) 124 in a message (block 1110). For example, in the example system 900 of FIG. 9, the media publisher 120 locates the media ID 122 and the device/user identifier(s) 124 in the collected data message 902. Alternatively, in the example system 1000 of FIG. 10 in which the apparatus 200 of FIG. 2 is implemented at the media publisher 120, the media publisher 120 generates the ACR ID 128 (FIGS. 2 and 10) based on the device/user identifier(s) 124, and locates the media ID 122 and the ACR ID 128 in the impression data 130 at block 1110. The media publisher 120 sends the media ID 122 and the device/user identifier(s) 124 (block 1112), for example, as the collected data 902 to the app publisher 110 as shown in FIG. 9, or as the impression data 130 to the AME 108 as shown in FIG. 10. The example process of FIG. 11 then ends.

Figure 15:
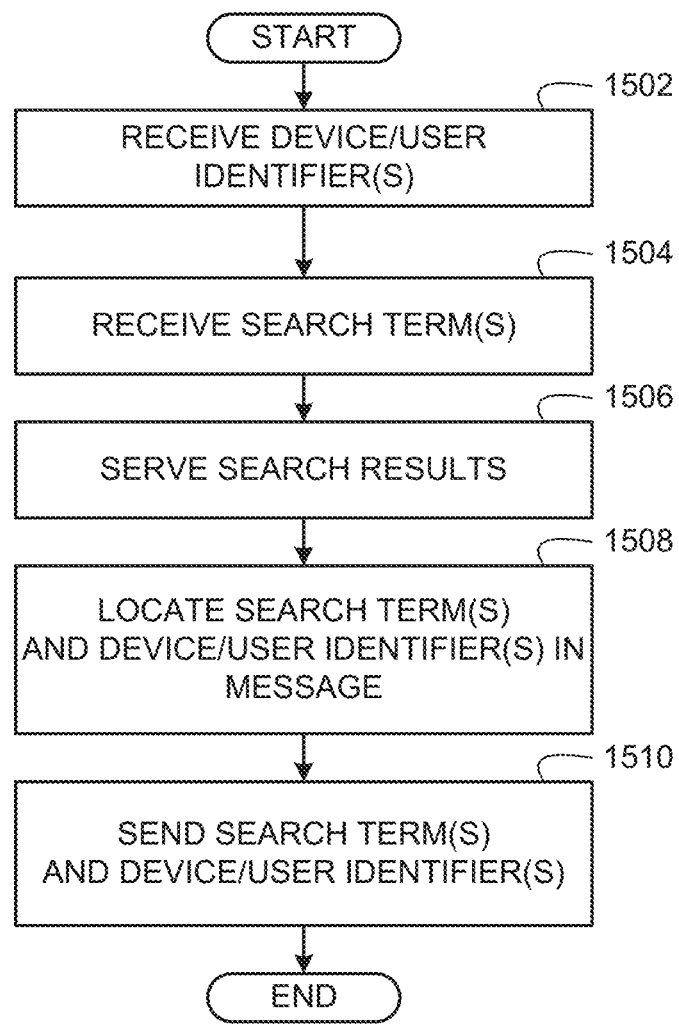
FIG. 15 is a flow diagram representative of example machine readable instructions that may be executed to collect search terms and device and/or user identifiers at a search provider.

FIG. 15 is a flow diagram of an example process that may be executed to collect search terms (e.g., the search term(s) 1210 of FIGS. 12-14) and device and/or user identifiers (e.g., the device/user identifiers 124 of FIGS. 12-14) at a search provider (e.g., the search provider 1212 of FIGS. 12-14). In the illustrated example, the example process of FIG. 15 is performed by a processor system (e.g., a server) at the search provider 1212 in connection with the example system 1300 of FIG. 13 and/or the example system 1400 of FIG. 14. However, the example process of FIG. 15 may be performed by any other device.

Initially, the search provider 1212 receives the device/user identifier(s) 124 (block 1502) from, for example, the data collector 1312 of FIG. 13 or the data collector 1412 of FIG. 14. For example, the search provider 1212 may receive the device/user identifier(s) 124 in an HTTP header of an HTTP request from the mobile device 106. The search provider 1212 receives the search term(s) 1210 from the app program 1204 (block 1504). The search provider 1212 serves search results (block 1506). For example, the search provider 1212 may use one or more of the device/user identifier(s) 124 received at block 1502 to identify the mobile device 106 as a receiving device of the search results. The search provider 1212 locates the search term(s) 1210 and the device/user identifier(s) 124 in a message (block 1508). For example, in the example system 1300 of FIG. 13, the search provider 1212 locates the search term(s) 1210 and the device/user identifier(s) 124 in the collected data message 1302. Alternatively, in the example system 1400 of FIG. 14 in which the apparatus 200 of FIG. 2 is implemented at the search provider 1212, the search provider 1212 generates the ACR ID 128 (FIGS. 2 and 14) based on the device/user identifier(s) 124, and locates the search term(s) 1210 and the ACR ID 128 in the user-interest data 1216 at block 1508. The search provider 1212 sends the search term(s) 1210 and the device/user identifier(s) 124 (block 1510), for example, as the collected data 1302 to the app publisher 110 as shown in FIG. 13, or as the user-interest data 1216 to the AME 108 as shown in FIG. 14. The example process of FIG. 15 then ends.

Figure 6:
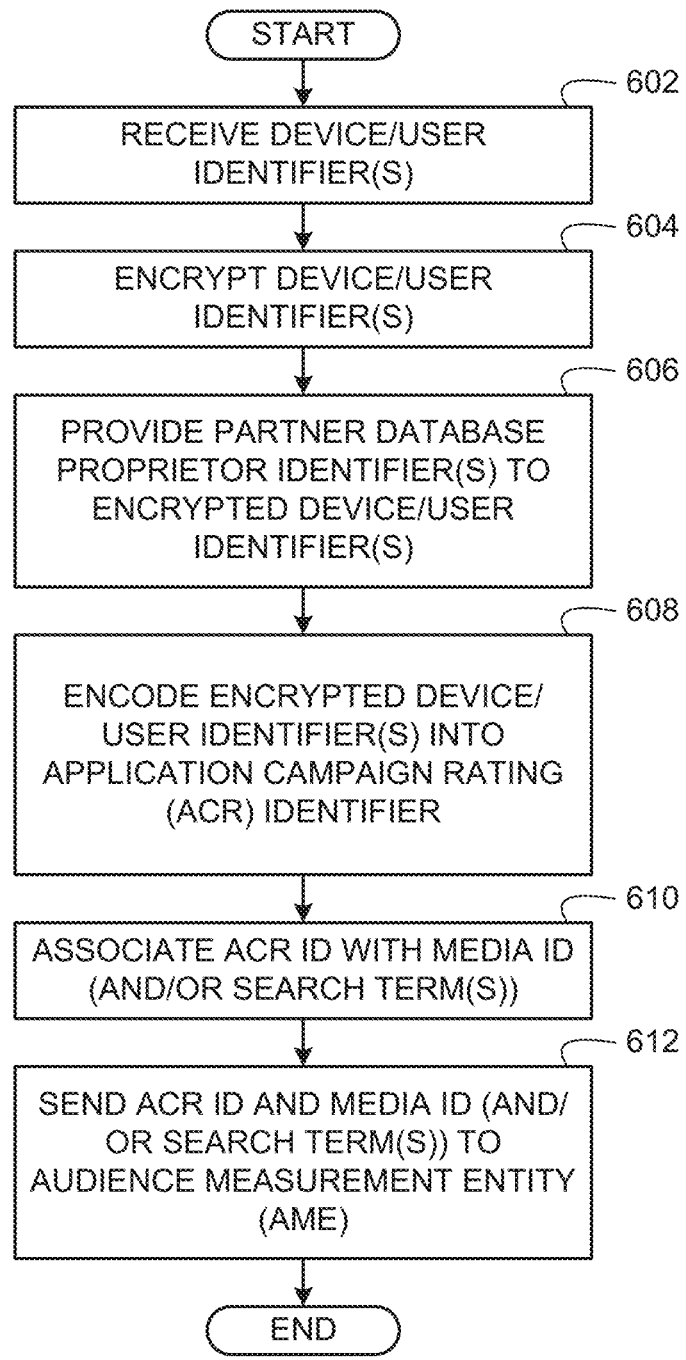
FIG. 6 is a flow diagram representative of example machine readable instructions that may be executed to encrypt device and/or user identifiers, and encode the encrypted device and/or user identifiers into the ACR identifier of FIG. 2.

FIG. 6 is a flow diagram of an example process to encrypt device and/or user identifiers (e.g., the device/user identifier(s) 124 of FIGS. 1 and 2), and to encode encrypted device and/or user identifiers (e.g., the encrypted device/user identifier(s) 208a-i of FIGS. 2-4) into the ACR ID 128 of FIGS. 1-4. The example process of FIG. 6 may be performed wholly or partially at the app publisher 110 of FIGS. 1, 9, and 10 (or another collection entity), wholly or partially at the mobile device 106 (e.g., at block 508 of the example process of FIG. 5), wholly or partially at the media publisher 120 of FIGS. 1, 9, and 10, and/or wholly or partially at the search provider 1212 of FIGS. 12-14. In some examples, operations performed by the encryptor 202 (FIG. 2) may be performed at the mobile device 106, and operations performed by the encoder 204 (FIG. 2) may be performed at the app publisher 110, at the media publisher 120, and/or at the search provider 1212.

Initially, the encryptor 202 (FIG. 2) receives one or more of the device/user identifier(s) 124 (FIGS. 1 and 2) (block 602). The encryptor 202 encrypts the device/user identifier(s) 124 (block 604) to generate the encrypted device/user identifier(s) 208a-i (FIG. 2). In the illustrated example, the encryptor 202 provides corresponding partner database proprietor identifiers to corresponding ones of the encrypted device/user identifier(s) 208a-i (block 606), for example, by appending, prepending, concatenating, or otherwise associating the partner database proprietor identifiers to or with the encrypted device/user identifier(s) 208a-i so that the partner database proprietor identifiers are accessible to the AME 108 without decrypting the encrypted device/user identifier(s) 208a-i. In particular, the identifier of the database proprietor having the key to decrypt the corresponding data is associated with the corresponding encrypted data. In this way, the AME 108 knows which database proprietor is to receive which data. The encoder 204 (FIG. 2) encodes the encrypted device/user identifier(s) 208a-i into the ACR ID 128 (block 608). In the illustrated example, the encoder 204 associates the ACR ID 128 with the corresponding media ID 122, and/or the search term(s) 1210 (block 610). The encoder 204 sends the ACR ID 128 and the media ID 122, and/or the search term(s) 1210, to the AME 108 (block 612), for example, in the impression data 130 (FIGS. 1, 9, and 10). The example process of FIG. 6 then ends.

Figure 7:
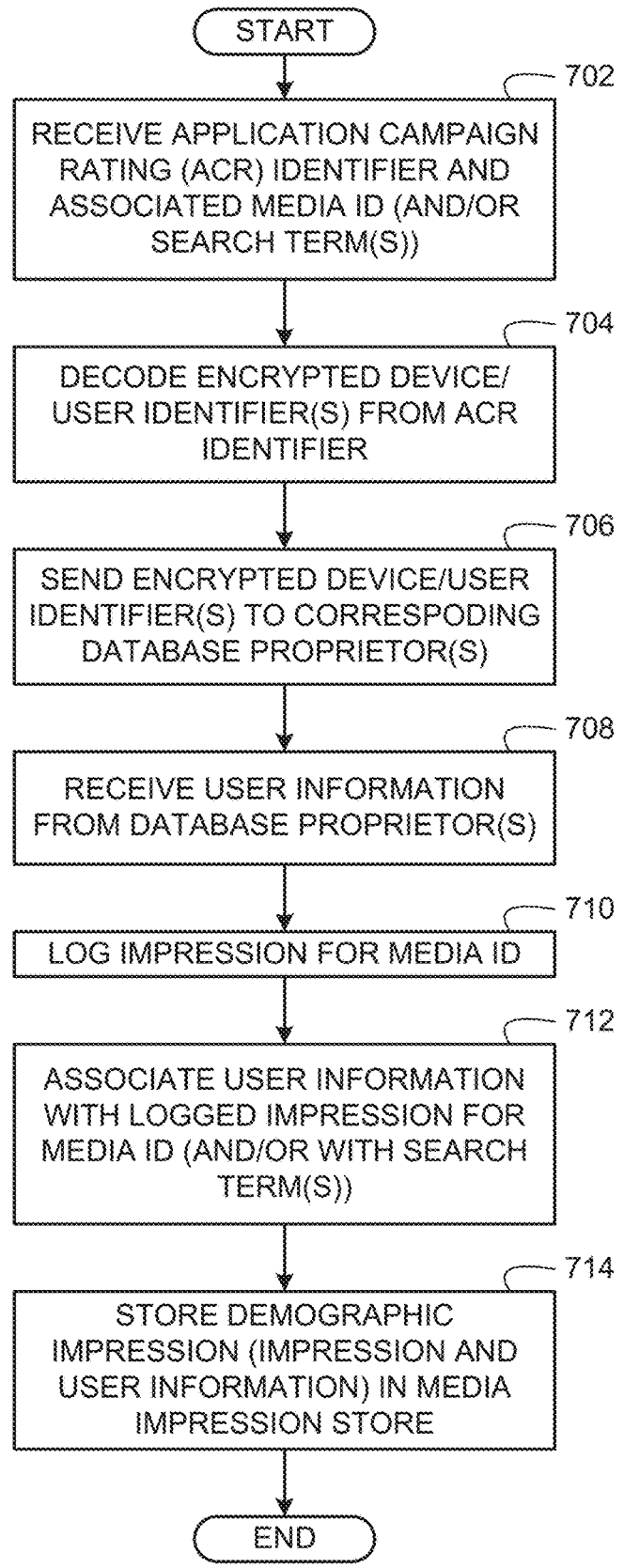
FIG. 7 is a flow diagram representative of example machine readable instructions that may be executed to decode encrypted device and/or user identifiers from the ACR identifier of FIG. 2, and collect user information associated with the encrypted device and/or user identifiers from corresponding database proprietors.

FIG. 7 is a flow diagram of an example process that may be used to decode encrypted device and/or user identifiers (e.g., the encrypted device/user identifiers 208a-i of FIGS. 2-4) from the ACR ID 128 of FIGS. 1-4, and collect user information associated with the encrypted device and/or user identifiers from one or more corresponding partner database proprietor(s) (e.g., one or more of the partner database proprietors 102a-e of FIGS. 1, 3, and 4). The example process of FIG. 7 may be performed at the AME 108 (FIG. 1), for example, by the server 132 (FIG. 1).

Initially, the server 132 receives the ACR ID 128 and the associated media ID 122, and/or the search term(s) 1210 (block 702). For example, the server 132 may receive the ACR ID 128 and the media ID 122 in the impression data 130 from the app publisher 110, from the media publisher 120, and/or from the mobile device 106 of FIGS. 1, 9, and 10. Additionally or alternatively, the server 132 may receive the ACR ID 128 and the search term(s) 1210 in the user-interest data 1216 from the app publisher 110, from the search provider 1212, and/or from the mobile device 106 of FIGS. 12-14. The decoder 302 (FIGS. 3 and 4) decodes one or more of the encrypted device/user identifier(s) 208a-i from the ACR ID 128 (block 704). The decoder 302 sends corresponding ones of the encrypted device/user identifier(s) 208a-i to corresponding ones of the partner database proprietor(s) 102a-e (block 706), for example, based on partner database proprietor identifiers provided to or associated with the encrypted device/user identifiers 208a-i by the encryptor 202 of FIG. 2 at block 606 of FIG. 6. The server 132 receives one or more of the user information 102a-e from one or more of the partner database proprietor(s) 102a-e (block 708). The server 132 logs a media impression for the media ID 122 (block 710). In addition, the server 132 associates the user information from at least one of the one or more user information 102a-e with the logged impression for the media ID 122, and/or with the search term(s) 1210 (block 712). The example server 132 stores the resulting demographic impression (e.g., impression and user information) in the media impressions store 134 (block 714). The example process of FIG. 7 then ends.

Figure 16:
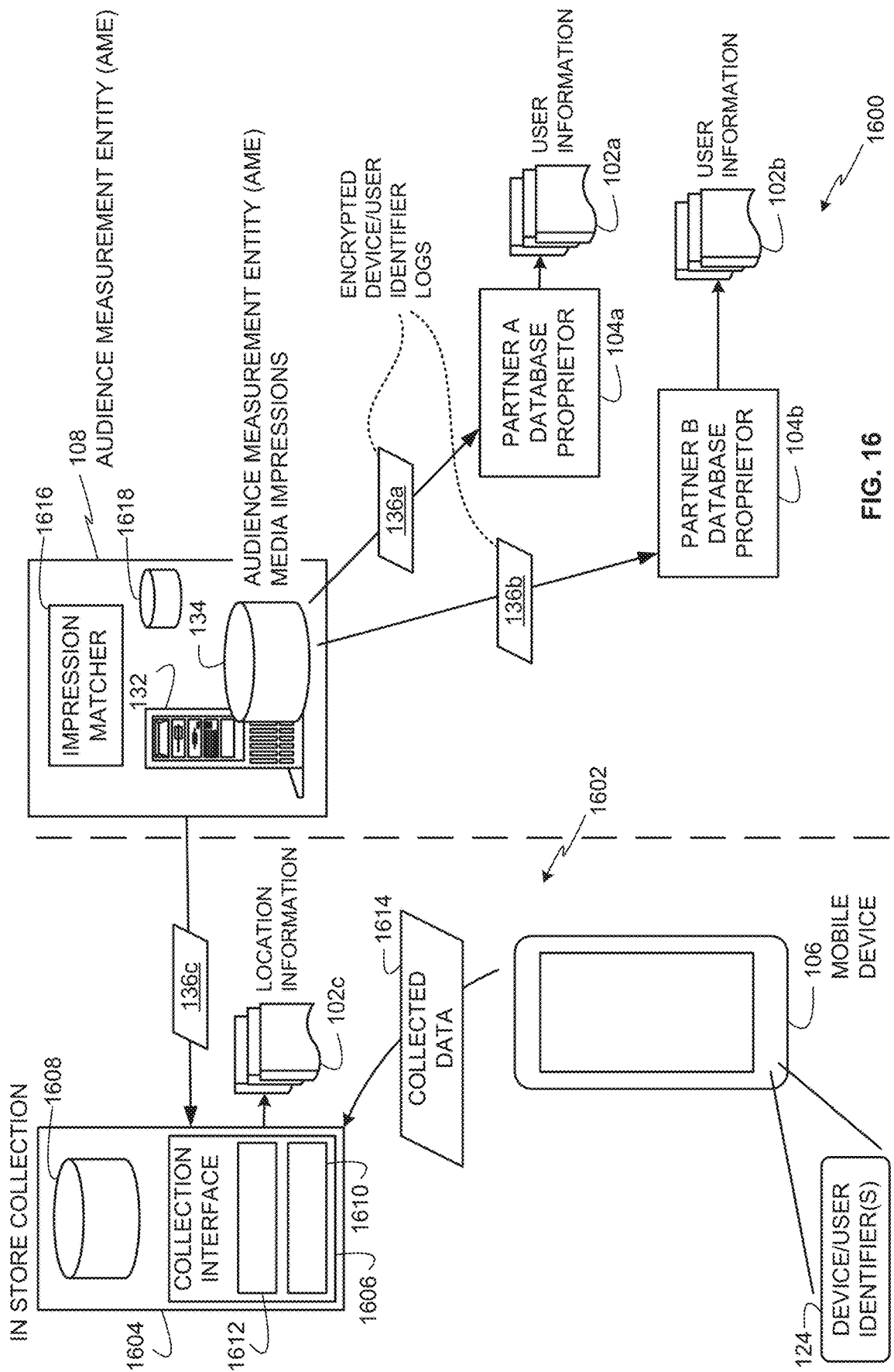
FIG. 16 depicts an example system to collect device information from mobile devices at retail locations for associating with impressions of media presented at mobile devices.

FIG. 16 depicts an example system 1600 to collect device information from mobile devices at a merchant location 1602 for associating with impressions of media presented at mobile devices. The example system 1600 of FIG. 16 may be used in conjunction with the methods and apparatus disclosed herein to link ad impressions of a mobile device user to purchasing behavior at a point of sale (POS) to more accurately measure advertisement effectiveness.

In the example of FIG. 16, the example mobile device 106 has entered a merchant location 1602 (e.g., a retail store, a kiosk, or any other brick-and-mortar merchant location). The example merchant location 1602 is or is associated with a database proprietor 1604 that includes a collection interface 1606 and a database 1608. The example collection interface 1606 includes a communications interface 1610 and a device/user identifier extractor 1612.

The example communications interface 1610 of FIG. 16 may be any wired and/or wireless communications interface. For example, the communications interface 1610 may be a wireless local area network (LAN) access point and/or a wireless LAN router. When the example mobile device 106 enters a communications range of the communications interface 1610, the mobile device 106 automatically scans and/or searches for wireless LAN access points and/or routers (e.g., to find an access point through which it can connect to the Internet, thereby conserving a limited cellular data allotment). The example collection interface 1606 collects data 1614 transmitted from the example mobile device 106.

In some examples, the mobile device 106 provides identifying information (e.g., in the collected data 1614), such as a media access control (MAC) address of one or more interfaces (e.g., a WiFi interface, a Bluetooth interface, etc.). In some examples, the mobile device 106 may provide one or more user identifier(s) (e.g., in the collected data 1614) when access to a wider network (e.g., the Internet) is provided via the communications interface 1610. The example device/user identifier extractor 1612 extracts the identifying information (e.g., the MAC address, a user identifier, etc.) from the communications received from the example mobile device 106. The example device/user identifier extractor 1612 stores the extracted identifying information in the example database 1608. In some examples, the device/user identifier extractor 1612 stores a timestamp of the mobile device communication, other extracted device and/or user identifiers, and/or a number of times the store location has been visited by the same mobile device 106 in the database 1608 in association with the extracted identifying information about the mobile device 106.

In some examples, the communications interface 1610 also obtains signal strength characteristics. For example, the communications interface 1610 may measure the signal strength of communications received from the mobile device 106. In combination with other collection interfaces 1606, the example collection interface 1606 may determine a more precise location of the mobile device within the merchant location 1602. For example, multiple (e.g., 3 or more) collection interfaces 1606 may triangulate the position of the mobile device 106 to enable a determination of what departments, store displays, products, advertisements, and/or other items of interest the mobile device 106 approached and/or was otherwise proximate to. In some examples, a series of determined positions for the mobile device 106 may be used to interpolate additional position(s) and, thus, corresponding departments, store displays, products, advertisements, and/or other items of interest the mobile device 106 approached and/or was otherwise proximate to. The precise location information may then be used to more precisely credit advertisement impressions (e.g., impressions occurring on the mobile device 106) with user behavior (e.g., purchasing or investigating the exposed products and/or services via physical store locations).

The example AME 108 transmits encrypted device/user identifier logs 136c to the example database proprietor 1604. In the example of FIG. 16, the AME 108 determines that the encrypted device/user identifier logs 136c correspond to (e.g., are to be transmitted to) the example database proprietor 1604 based on an unencrypted partner database proprietor identifier. The example encrypted device/user identifier logs 136c include at least those device/user identifier(s) of the type(s) collected by the example database proprietor 1604. On receiving the encrypted device/user identifier logs 136c, the example partner database proprietor 1604 decrypts its respective encrypted device/user identifier(s) using its copy(ies) of the encryption key(s). The partner database proprietor 1604 then looks up (e.g., from the database 1608) the mobile device(s) 106 corresponding to the decrypted device/user identifiers, and collect corresponding device/user information (e.g., a number of times the device 106 entered the location 1602; a set of products, services, advertisements, and/or other items of interest within the location 1602 to which the user of the device 106 may have been exposed) for those users for sending to the AME 108. For example, if the partner database proprietor 1604 is a merchant (e.g., the location 1602 is a retail store), the encrypted device/user identifier log 136c may include MAC addresses, and the merchant accesses its monitoring records to find users and/or devices having MAC addresses matching the MAC addresses received in the encrypted device/user identifier log 136c. When the users and/or devices are identified, the merchant copies the users' user information to location information 1615 for delivery to the AME 108.

The example AME 108 receives the location information in association with the ACR ID. Using the ACR ID, the example AME 108 matches the location information to media impression information. The media impression information may include media impressions delivered to the user associated with the ACR ID via the mobile device 106 and/or via any other platforms for which media impression data is collected (e.g., personal computers).

To match the media impression information to the location information, the example AME 108 includes an impression matcher 1616. The example impression matcher 1616 of FIG. 16 determines products, services, brands, and/or other entities that are advertised in the impressions associated with an ACR ID. For example, the impression matcher 1616 may access an advertisement database 1618 that provides the entity corresponding to each advertisement to be measured or monitored by the AME 108. The example impression matcher 1616 queries the example advertisement database 1618 to determine the entities (e.g., products, services, brands, companies, etc.) that have been exposed on an ACR ID.

Using a list of the entities that have been exposed on a device associated with an ACR ID, the example impression matcher 1616 matches the products and/or services to which the user corresponding to the ACR ID has been exposed to the entities that have been exposed on a device associated with the ACR ID. For example, the impression matcher 1616 may determine from the exposed that the user has been shown an advertisement for a Rawlings® brand basketball. Based on the exposed product, the example impression matcher 1616 then identifies that the user has been positioned sufficiently proximate to the basketballs area in the merchant location 1602 (e.g., a sporting goods store) based on the location information from the database proprietor 1604 to determine that the user may have further investigated the advertised basketball. The example impression matcher 1616 increases an effectiveness rating for the example basketball advertisement based on the correlation between the example impression and the subsequent proximity to the location. The example impression matcher 1616 may continue the cross-referencing of impressions to location information to determine which of the impressions can be credited with potentially influencing user behavior.

In some examples, the determination of user proximity to products and/or services based on the location information is performed by the example database proprietor 1604, which may have a more detailed and/or up-to-date mapping of areas within the merchant location 1602 to products, services, brands, and/or other entities. In such examples, the example database proprietor 1604 may provide the proximity information in combination with and/or as a substitute for position information within the merchant location 1602 (e.g., which aisle the mobile device 106 was in, what displays the mobile device 106 was proximate to, etc.). Example methods and apparatus to monitor behavior of persons in a retail location are described in U.S. patent application Ser. No. 11/957,227, which is incorporated by reference in its entirety.

Figure 17:
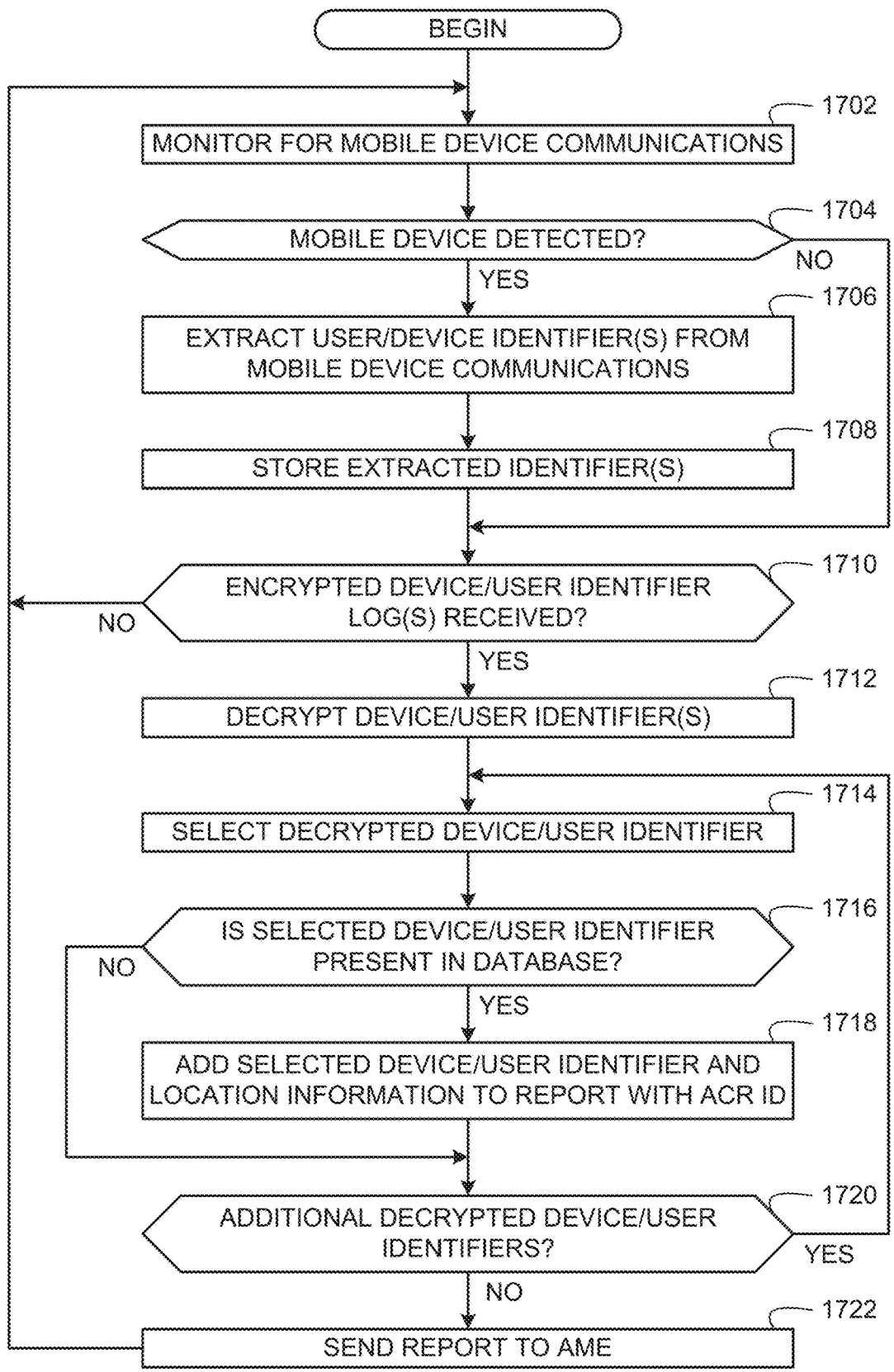
FIG. 17 is a flowchart representative of example machine readable instructions which may be executed to collect location data from a user and/or a mobile device.

FIG. 17 is a flowchart representative of example machine readable instructions which may be executed to implement the example collection interface 1606, the example database 1608, the example communications interface 1610, the example device/user identifier extractor 1612 and/or, more generally, the example database proprietor 1604 of FIG. 16 to collect location data from a user and/or a mobile device.

The example communications interface 1610 of FIG. 16 monitors for mobile device communications (block 1702). For example, the communications interface 1610 may monitor for mobile device communications that "ping" a local area for wireless network information. If the example communications interface 1610 detects a mobile device (block 1704), the example device/user identifier extractor 1612 extracts device/user identifier(s) from the mobile device communications (block 1706). For example, the device/user identifier extractor 1612 may extract information such as a MAC address from one or more of the mobile device's wireless interfaces. The example device/user identifier extractor 1612 stores extracted identifier(s) (e.g., in the database 1608) (block 1708).

After storing the extracted identifier(s) (block 1708), or if a mobile device is not detected (block 1704), the example database proprietor 1604 determines whether encrypted device/user identifier log(s) have been received (block 1710). If encrypted device/user identifier log(s) have not been received (block 1710), control returns to block 1702.

When encrypted device/user identifier log(s) have been received (block 1710), the example database proprietor 1604 decrypts the device/user identifier(s) (block 1712). For example, the database proprietor 1604 may use a private key to decrypt the device/user identifier(s) encrypted by the AME 108 using the database proprietor's 1604 respective key. The example database proprietor 1604 selects a decrypted device/user identifier (block 1714) and determines whether the selected device/user identifier is present in the database 1608 (block 1716). For example, the device/user identifier may be present in the database 1608 if the mobile device corresponding to the device/user identifier (e.g., the mobile device 106) has visited the location 1602 monitored by the example database proprietor 1604.

If the selected device/user identifier is present in the database (block 1716), the example database proprietor 1604 adds the selected device/user identifier and associated location information to a report with the ACR ID of the device/user identifier (block 1718). For example, the database proprietor 1604 may add information to the report describing which products, services, brands, and/or other entities to which the mobile device 106 was proximate. The example database proprietor 1604 associates the information with the ACR ID (e.g., received in association with the encrypted device/user identifier) in the report.

The example database proprietor 1604 determines whether there are additional decrypted device/user identifiers for which location information is to be determined (block 1720). If there are additional decrypted device/user identifiers (block 1720), control returns to block 1714. On the other hand, when there are no additional device/user identifiers (block 1720), the example database proprietor 1604 sends the generated report (e.g., the ACR IDs and location information) to the AME 108 (block 1722). Control returns to block 1702 to continue monitoring for mobile device communications.

Figure 18:
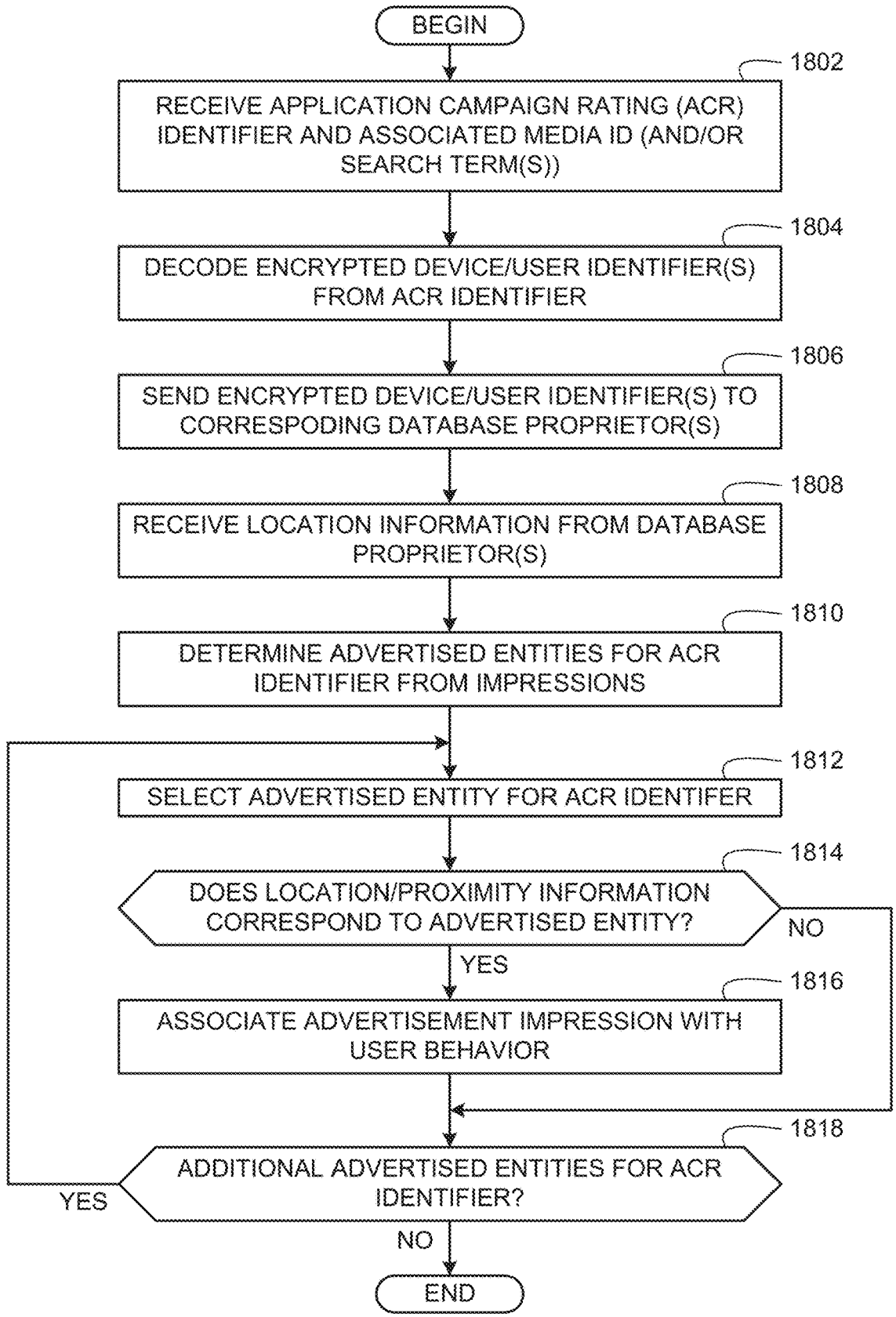
FIG. 18 is a flowchart representative of example machine readable instructions which may be executed to associate media impressions with mobile device location information.

FIG. 18 is a flowchart representative of example machine readable instructions which may be executed to implement the example AME 108 of FIG. 16 to associate media impressions with mobile device location information. The example instructions of FIG. 18 may be performed in conjunction with the example instructions of FIG. 7 described above.

The example server 132 of FIG. 16 receives the ACR ID 128 and the associated media ID 122, and/or the search term(s) 1210 (block 1802). For example, the server 132 may receive the ACR ID 128 and the media ID 122 in the impression data 130 from the app publisher 110, from the media publisher 120, and/or from the mobile device 106 as described above with respect to FIGS. 1, 9, 10, and/or 16. Additionally or alternatively, the server 132 may receive the ACR ID 128 and the search term(s) 1210 in the user-interest data 1216 from the app publisher 110, from the search provider 1212, and/or from the mobile device 106 of FIGS. 12-14. The decoder 302 (FIGS. 3 and 4) decodes one or more of the encrypted device/user identifier(s) 208a-i from the ACR ID 128 (block 1804). The decoder 302 sends corresponding ones of the encrypted device/user identifier(s) 208a-i (e.g., the encrypted device identifier logs 136c) to corresponding ones of the partner database proprietor(s) 104a, 104b, 1604 (block 1806), for example, based on partner database proprietor identifiers provided to or associated with the encrypted device/user identifiers 208a-i by the encryptor 202 of FIG. 2 at block 606 of FIG. 6. The example instructions of FIG. 17 may be executed when the decoder 302 sends the encrypted device/user identifier logs 136c to the example database proprietor 1604 of FIG. 16. Based on execution of the instructions of FIG. 17, the example server 132 receives location/proximity information 102c from the example database proprietor 1604.

The example impression matcher 1616 of FIG. 16 receives location information from the database proprietors (e.g., the database proprietor 1604 of FIG. 16) (block 1808). The example impression matcher 1616 determines the advertised entities for the ACR ID based on the impressions (block 1810). For example, the impression matcher 1616 determines a product, service, brand, company, or other entity that is advertised in each impression by performing a look up in the database 1618 of FIG. 16. The ad may be a traditional advertisement or an intentionally placed product in a media program. Example methods and apparatus to identify intentionally placed products are described in U.S. patent application Ser. No. 12/049,077, which is incorporated by reference in its entirety.

The example impression matcher 1616 of FIG. 16 selects an advertised entity (e.g., product, service, brand, company, etc.) for an ACR ID (block 1812). The impression matcher 1616 determines whether the location and/or proximity information corresponds to the selected advertised entity (block 1814). For example, the impression matcher 1616 may attempt to cross-reference the advertised entity to the location and/or proximity information received for the ACR ID (e.g., determine whether the user or mobile device was proximate to the selected advertised entity). If the location and/or proximity information corresponds to the selected advertised entity (block 1814), the example impression matcher 1616 associates the advertisement impression for the selected advertised entity with user behavior (block 1816). For example, the impression matcher 1616 may indicate that the advertisement impression resulted in (or is at least correlated with) the user approaching the advertised entity of the advertisement impression.

After associating the impression with the user behavior (block 1816) or if the location/proximity information does not correspond to the selected advertised entity (block 1814), the example impression matcher 1616 determines whether there are additional advertised entities for the ACR ID (block 1818). If there are additional advertised entities for the ACR ID (block 1818), control returns to block 1812. When there are no additional advertised entities for the ACR ID (block 1818), the example instructions of FIG. 18 end.

Figure 19:
FIG. 19 is a table showing example information that may be collected and stored at the example database proprietor of FIG. 16.

FIG. 19 is a table 1900 showing example information that may be collected and stored at the example database proprietor 1604 (e.g., in the database 1608) of FIG. 16. The example table 1900 includes a set of entries 1902-1912. Each of the example entries includes a device/user identifier 1914, a timestamp 1916, a location code 1918, proximity information 1920, and one or more keywords 1922.

The example device/user identifier 1914 of FIG. 19 is a unique device/user identifier that may be used to match location data to an ACR ID (e.g., an ACR ID received in a request for user information from the AME 108). In the example of FIG. 19, the device/user identifiers 1914 are MAC addresses of mobile device wireless interfaces. However, additional and/or alternative device/user identifiers may be used.

The example location code 1918 may designate an area within the location (e.g., the location 1602) at which the mobile device 106 corresponding to the ID 1914 is determined to be (e.g., based on triangulation and/or other location techniques). Example location codes 1918 are illustrated in FIG. 19, but any other location designator may be used.

The example proximity information 1920 of FIG. 19 identifies products, services, store displays, and/or other entities or items to which the mobile device 106 is determined to have been exposed based on the location information. For example, when the mobile device 106 is determined to be in location corresponding to location code 1918 A14 (e.g., entry 1902), the example database proprietor 1604 may determine that the user of the mobile device 106 is proximate to products having the codes (e.g., UPCs, internal identifiers, universal identifiers, etc.) listed in the proximity field 1920. Additionally or alternatively, the example table 1900 includes keywords 1922 corresponding to the proximity information to, for example, facilitate searching or cross-referencing by the AME 108 to match impressions to proximity information. For example, the keywords 1922 for the entry 1902 describe the example proximity codes 1920 for the entry 1902.

In some examples, the table 1900 stores location information broken into multiple entries, such as entries 1906 and 1908. The example entries 1906, 1908 share the same device/user identifier 1914, timestamp 1916, and location code 1918, but split the proximity codes 1920 and keywords 1922 to, for example, organize the products, services, store displays, and/or other entities or items in the table 1900. In some other examples, shown in entries 1904 and 1910, 1912, the example table 1900 includes one or the other of the proximity information 1920 and/or the keywords 1922.

Figure 20:
FIG. 20 is a table showing example matching of impression information to location information provided by the database proprietor of FIG. 16.

FIG. 20 is a table 2000 showing example matching of impression information to location information provided by the database proprietor 1604 of FIG. 16. The example table 2000 may be constructed and/or populated by, for example, the impression matcher 1616 of FIG. 16, and includes a set of entries 2002-2008 that associate or match an ACR ID 2010 to a media identifier 2012 and a location identifier 2014. In some examples, the ACR ID 2010 may be used to associate the media identifier 2012 with the location identifier 2014, but may then be omitted (e.g., not stored in the table 2000) when the association between the media identifier 2012 and the location identifier 2014 is made.

The example media identifier 2012 uniquely identifies each item of media (e.g., advertisement, content, etc.) that may be shown to the example user and/or via the example mobile device 106 associated with the user. The example location identifier 2014 uniquely identifies the location (e.g., a merchant location such as a particular retail store, or any other location) where user behavior is identified that may be attributed to the media corresponding to the media identifier 2012. For example, a location identifier may identify a particular location (e.g., the merchant location 1602 of FIG. 16, one retail location in a retail chain, etc.) of the database proprietor 1604, whereas a different location identifier may identify another particular location of the same database proprietor 1604. The example table 2000 may include duplicates of entries 2002-2008 for different ACR ID's and/or may include a field indicating the number of occurrences of a particular entry 2002-2008.

The example AME 108 analyzes the table 2000 to determine an effectiveness of the media being presented to users by determining which media (e.g., advertisements, content, product placements, etc.) influence consumer behavior. For example, media identifiers that are associated with larger numbers of location identifiers and/or larger numbers of occurrences of an association may be considered to be more effective at influencing user behavior.

Figure 21:
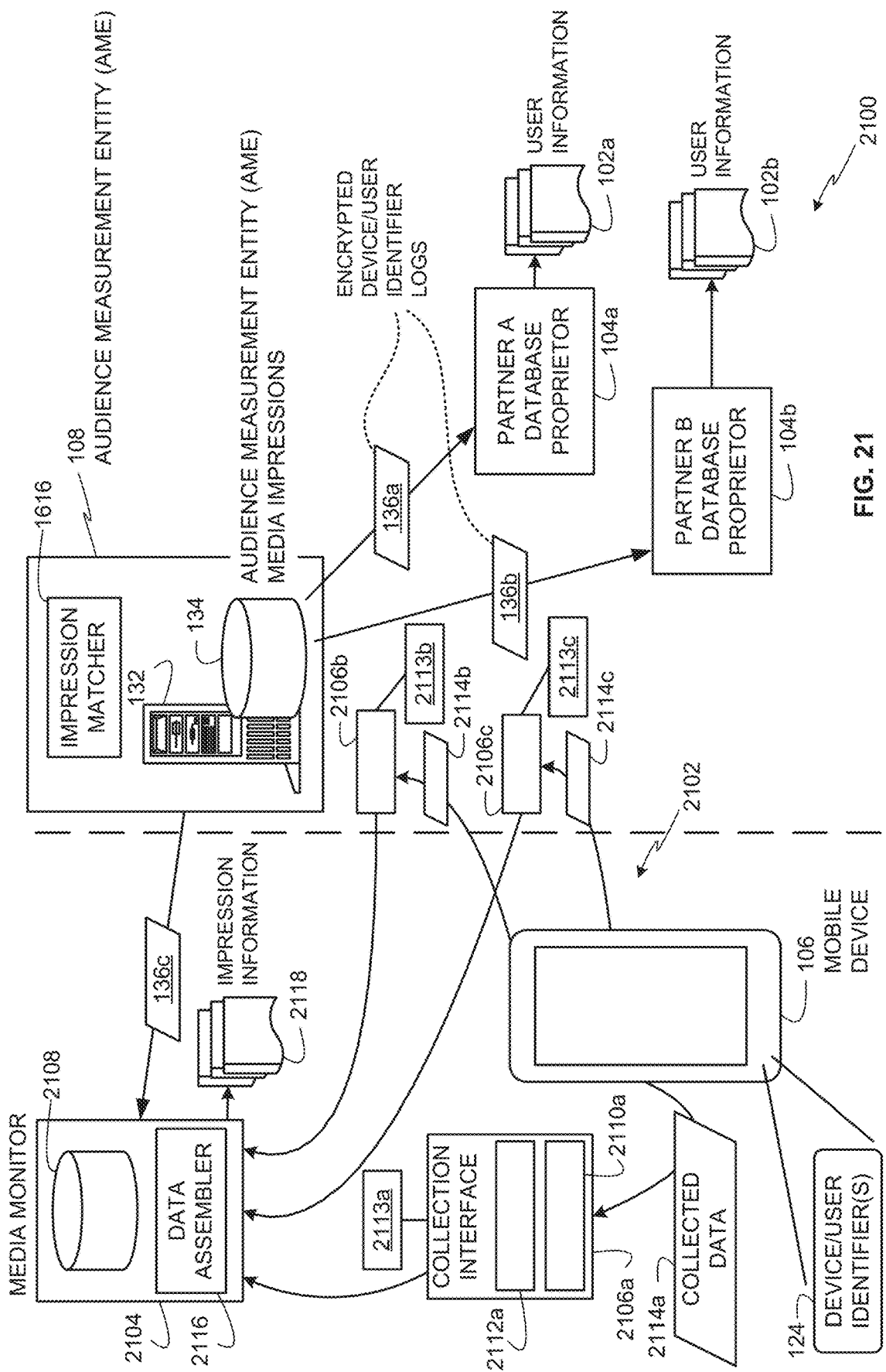
FIG. 21 depicts an example system to collect device information from mobile devices at a media location for collecting impression information for mobile devices.

FIG. 21 depicts an example system 2100 to collect device information from mobile devices at a media location 2102 for collecting impression information for mobile devices. The example media location 2102 of FIG. 21 is associated with a database proprietor 2104 and includes a collection interface 2106a. The collection interface 2106a of this example includes a communications interface 2110a and a device/user identifier extractor 2112a. The example collection interface 2106a is associated with designated media 2113a (e.g., a billboard, indoor and/or outdoor signage, or other fixed location media presentations) and identifies unique device/user identifiers 124 of mobile devices (e.g., the mobile device 106) that enter the media location 2102. Similar or identical collection interfaces 2106b, 2106c are associated with other respective media 2113b, 2113c. The example collection interfaces 2106a-2106c, the example communications interface 2110a, and the example device/user identifier extractor 2112a may be similar or identical to respective ones of the collection interfaces 1606, the example communications interface 1610, and the example device/user identifier extractor 1612 of FIG. 16.

When the mobile device 106 is determined to have entered the media location 2102 associated with the media 2113a, the example collection interface 2106a collects data 2114a including the identifiers 124 from the mobile device 106. The example collection interface 2106a (e.g., via the communications interface 2110a and the device/user identifier extractor 2112a) extracts the device/user identifier 124 from communications from the mobile device 106.

The example database proprietor 2104 of FIG. 21 includes a data assembler 2116 to collect the extracted data from the example collection interfaces 2106a-2106c. The example database proprietor 2104 stores the extracted data (e.g., in the database 2108) in association with identifiers of the locations from which the identifiers were collected and/or the media associated with the locations. Thus, the example database proprietor 2104 collects and stores information identifying mobile devices and/or users that were within a sufficient distance for the user to be considered to have been exposed to the media 2113a-2113c.

When the example AME 108 of FIG. 21 transmits encrypted device/user identifier logs 136a, 136b, the AME 108 further transmits encrypted device/user identifier logs 136c to the example database proprietor 2104. The example encrypted device/user identifier logs 136c includes at least those device/user identifier(s) of the type(s) collected by the example database proprietor 2104. On receiving the encrypted device/user identifier logs 136c, the example partner database proprietor 2104 decrypts its respective encrypted device/user identifier(s) using its copy(ies) of the encryption key(s). The partner database proprietor 2104 then looks up (e.g., from the database 2108) the mobile device(s) 106 corresponding to the decrypted device/user identifiers, and collects corresponding device/user information (e.g., a number of times the device 106 entered media location(s) and/or an identification of the media to which those users were exposed at the location(s)) for sending to the AME 108. For example, the encrypted device/user identifier log 136c may include MAC addresses, and the partner database proprietor 2104 accesses the database 2108 to identify users and/or devices having MAC addresses matching the MAC addresses received in the encrypted device/user identifier log 136c. When the users and/or devices are identified, the partner database proprietor 2104 copies the users' user information and the media to which the identified users were exposed to impression information 2118 for delivery to the AME 108.

The example AME 108 receives the impression information 2118 including the ACR ID. Using the ACR ID, the example AME 108 matches the media impression information 2118 associated with the media locations to the user information (e.g., received from the database proprietors 104a, 104b). The impression information 2118 is further associated with impression information obtained from the mobile device 106, demographic information obtained from other partner database proprietors (e.g., the database proprietors 104a, 104b of FIG. 21), and/or user behavior information obtained from the database proprietor 1604 of FIG. 16 as described in detail above. By matching the media impression information 2118 to the user information, the example AME 108 may supplement the location-based media impression data with demographic information. The media impression information 2118 may include media impressions delivered to the user associated with the ACR ID via the mobile device 106 and/or via any other platforms for which media impression data is collected (e.g., personal computers).

Figure 22:
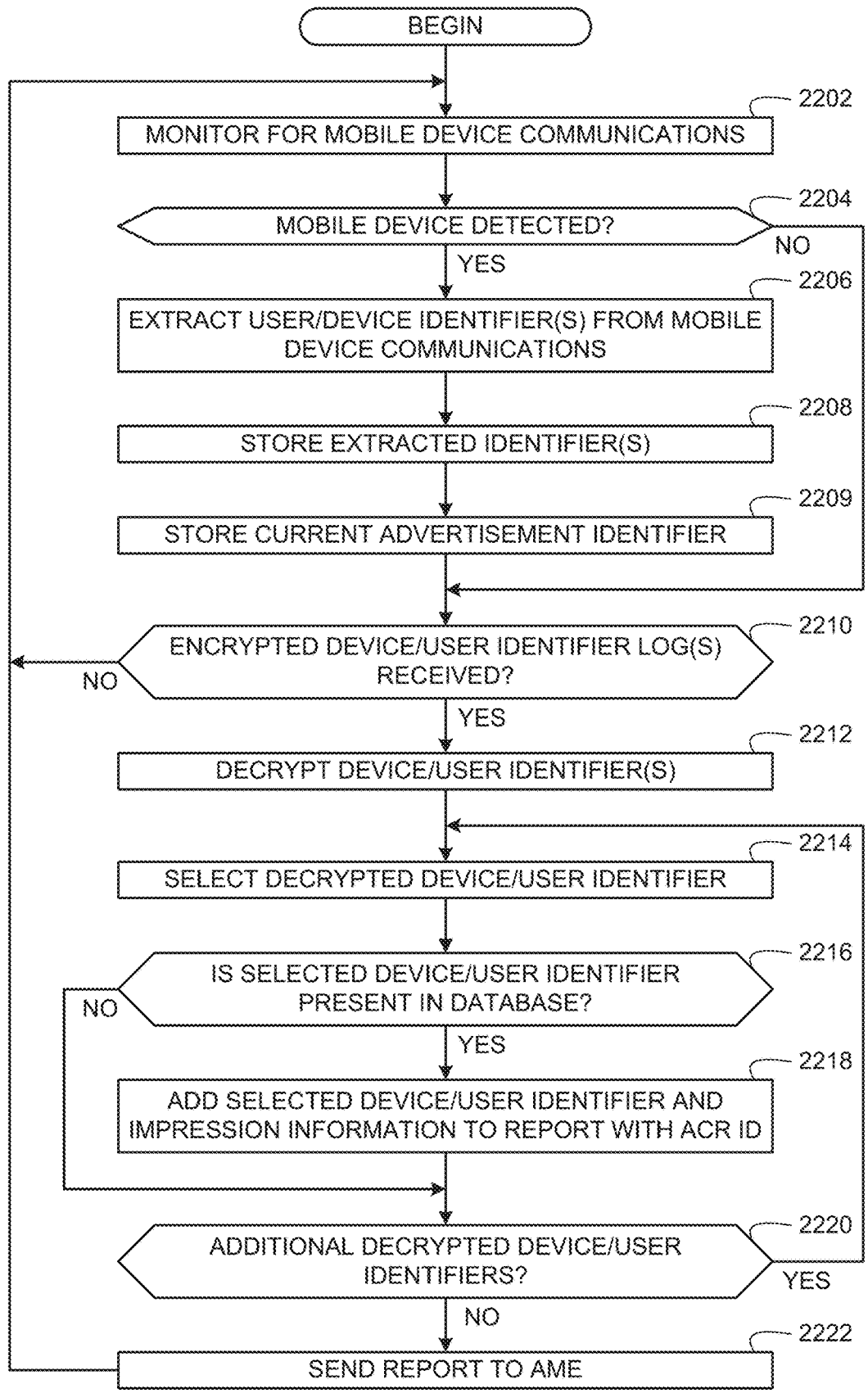
FIG. 22 is a flowchart representative of example machine readable instructions which may be executed to collect impression information from a user and/or a mobile device.

FIG. 22 is a flowchart representative of example machine readable instructions which may be executed to implement the example data assembler 2116, the example database 2108, the example communications interface 2110, the example device/user identifier extractor 2112 and/or, more generally, the example collection interface 2106 and/or the example database proprietors 1604a-1604c of FIG. 21 to collect impression data from a user and/or a mobile device.

The example communications interface 1610 of FIG. 16 monitors for mobile device communications (block 2202). For example, the communications interface 2110a may monitor for mobile device communications that "ping" a local area for wireless network information. If the example communications interface 2110a detects a mobile device (block 2204), the example device/user identifier extractor 2112a extracts device/user identifier(s) from the mobile device communications (block 2206). For example, the device/user identifier extractor 2112a may extract information such as a MAC address from one or more of the mobile device's wireless interfaces. The example device/user identifier extractor 2112a stores extracted identifier(s) (e.g., in the database 2108) (block 2208). The example device/user identifier extractor 2112a also stores a current media identifier (e.g., an identifier of media being displayed at the time of receipt or extraction of the device identifier) (block 2209). For example, some location-based displays may periodically or aperiodically change the media being displayed (e.g., cycle through a series of advertisements, changing the advertisement every X seconds, etc.). In examples in which the media is relatively static (e.g., not changed often), block 2209 may be omitted.

After storing the extracted identifier(s) (block 2208) and/or the current advertisement identifier (block 2209), or if a mobile device is not detected (block 2204), the example database proprietor 2104 determines whether encrypted device/user identifier log(s) have been received (block 2210). If encrypted device/user identifier log(s) have not been received (block 2210), control returns to block 2202.

When encrypted device/user identifier log(s) have been received (block 2210), the example database proprietor 1604 decrypts the device/user identifier(s) (block 2212). For example, the database proprietor 1604 may use a private key to decrypt the device/user identifier(s) encrypted by the AME 108 using the database proprietor's 1604 respective key. The example database proprietor 1604 selects a decrypted device/user identifier (block 2214) and determines whether the selected device/user identifier is present in the database 1608 (block 2216). For example, the device/user identifier may be present in the database 1608 if the mobile device corresponding to the device/user identifier (e.g., the mobile device 106) has visited the location 1602 monitored by the example database proprietor 1604.

If the selected device/user identifier is present in the database (block 2216), the example database proprietor 1604 adds the selected device/user identifier and associated media impression information to a report with the ACR ID of the device/user identifier (block 2218). For example, the database proprietor 1604 may add information to the report describing the media to which the user of the media device 106 was exposed. The example database proprietor 1604 associates the information with the ACR ID (e.g., received in association with the encrypted device/user identifier) in the report.

After adding the selected device/user identifier and impression information to the report (block 2218), or if the selected device/user identifier is not present in the database 2108 (block 2216). The example database proprietor 1604 determines whether there are additional decrypted device/user identifiers for which location information is to be determined (block 2220). If there are additional decrypted device/user identifiers (block 2220), control returns to block 2214. On the other hand, when there are no additional device/user identifiers (block 2220), the example database proprietor 1604 sends the generated report (e.g., the ACR IDs and location information) to the AME 108 (block 2222). Control returns to block 2202 to continue monitoring for mobile device communications.

Figure 23:
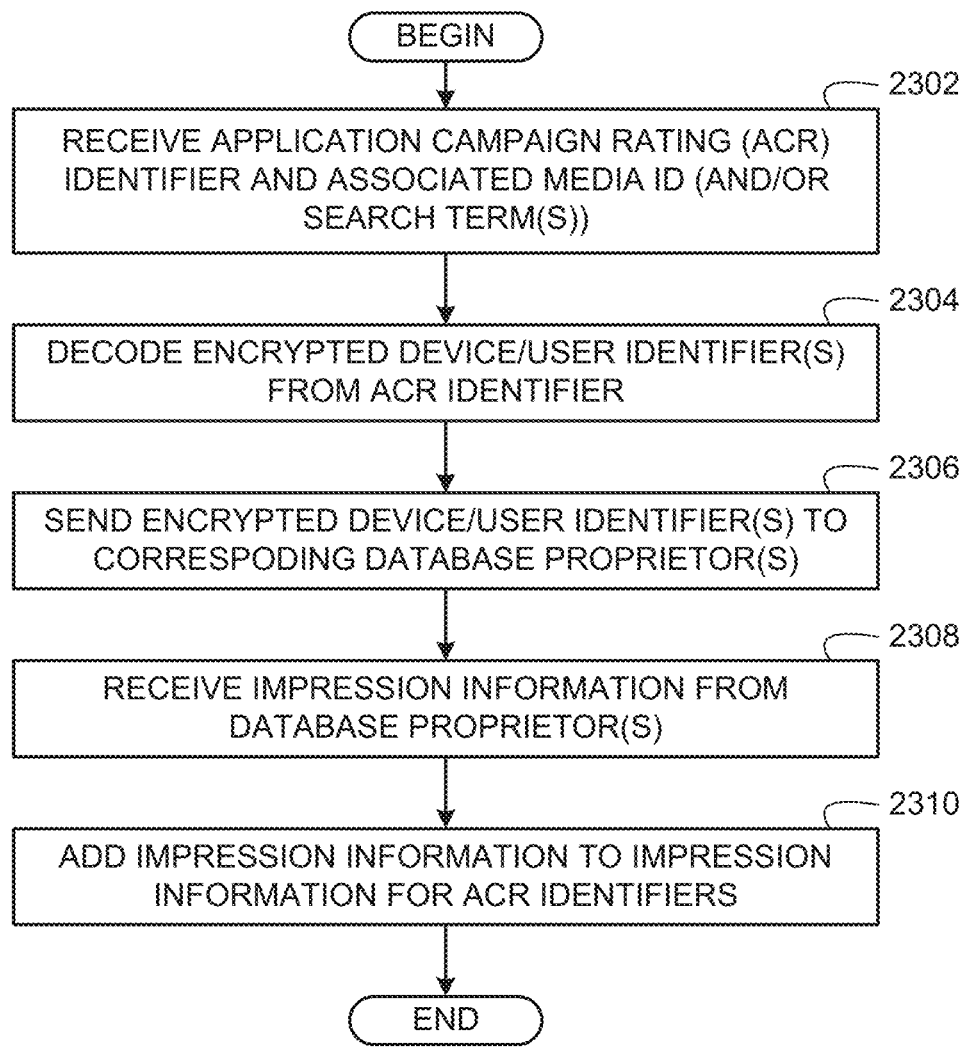
FIG. 23 is a flowchart representative of example machine readable instructions which may be executed to obtain impression information for a user and/or a mobile device.

FIG. 23 is a flowchart representative of example machine readable instructions which may be executed to implement the example AME 108 of FIG. 21 to obtain impression information for a user and/or a mobile device.

The example server 132 of FIG. 16 receives the ACR ID 128 and the associated media ID 122, and/or the search term(s) 1210 (block 2302). For example, the server 132 may receive the ACR ID 128 and the media ID 122 in the impression data 130 from the app publisher 110, from the media publisher 120, and/or from the mobile device 106 as described above with respect to FIGS. 1, 9, 10, 12, 13, and/or 14. Additionally or alternatively, the server 132 may receive the ACR ID 128 and the search term(s) 1210 in the user-interest data 1216 from the app publisher 110, from the search provider 1212, and/or from the mobile device 106 of FIGS. 12-14. The decoder 302 (FIGS. 3 and 4) decodes one or more of the encrypted device/user identifier(s) 208a-i from the ACR ID 128 (block 2304). The decoder 302 sends corresponding ones of the encrypted device/user identifier(s) 208a-i to corresponding ones of the partner database proprietor(s) 104a, 104b, 2104 (block 2306), for example, based on partner database proprietor identifiers provided to or associated with the encrypted device/user identifiers 208a-i by the encryptor 202 of FIG. 2 at block 606 of FIG. 6.

The example impression matcher 1616 of FIG. 21 receives impression information 2118 from the database proprietors (e.g., the database proprietor 2104 of FIG. 21) (block 2308). The example impression information 2118 includes an ACR ID associated with a media identifier. For example, the impression information 2118 include elements similar to the ACR ID 2010 and the media identifier 2012 of FIG. 20. The example AME 108 adds the impression information 2118 received from the database proprietor 2104 to the impression information corresponding to the ACR IDs (block 2310). For example, the AME 108 may have a list of media impressions for a given ACR ID. The example AME 108 adds the media impressions that are received from the database proprietor 2104 and associated with the ACR ID to the list of media impressions, thereby increasing the amount of information pertaining to the impressions of the users about whom impression data is collected. The example instructions of FIG. 23 end.

In some examples, the AME 108 further determines the demographic of the audience for the example location-based media for which data is collected via the database proprietor 2104. Thus, the audience demographics of the example media and/or the example locations at which the location-based media are presented can be accurately measured.

While an example manner of implementing the 200, 300 and the systems 1600, 2100 are illustrated in FIGS. 2, 3, 4, 12, 13, 14, 16, and/or 21, one or more of the elements, processes and/or devices illustrated in FIGS. 2, 3, 4, 12, 13, 14, 16, and/or 21 may be combined, divided, re-arranged, omitted, eliminated and/or implemented in any other way. Further, the example encryptor 202, the example encoder 204, the example decoder 302, the example database proprietors 1604, 2104, the example collection interfaces 1606, 2106a-2106c, the example communication interfaces 1610, 2110, the example device/user identifier extractors 1612, 2112, the example impression matcher 1616, the example database 1618, the example data assembler 2116 and/or, more generally, the example apparatus 200 and/or 300 and/or systems 1600 and/or 2100 of FIGS. 2, 3, 4, 12, 13, 14, 16, and/or 21 may be implemented by hardware, software, firmware and/or any combination of hardware, software and/or firmware. Thus, for example, any of the example encryptor 202, the example encoder 204, the example decoder 302, the example database proprietors 1604, 2104, the example collection interfaces 1606, 2106a-2106c, the example communication interfaces 1610, 2110, the example device/user identifier extractors 1612, 2112, the example impression matcher 1616, the example database 1618 and/or, more generally, the example apparatus 200 and/or 300 and/or systems 1600 and/or 2100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). A logic circuit is a non-human hardware device (e.g., an electronic device, a semiconductor device) capable of implementing Boolean logic. When reading any of the apparatus or system claims of this patent to cover a purely software and/or firmware implementation, at least one of the example encryptor 202, the example encoder 204, the example decoder 302, the example database proprietors 1604, 2104, the example collection interfaces 1606, 2106a-2106c, the example communication interfaces 1610, 2110, the example device/user identifier extractors 1612, 2112, the example impression matcher 1616, the example database 1618, and/or, the example data assembler 2116 is/are hereby expressly defined to include a tangible computer readable storage device or storage disk such as a memory, a digital versatile disk (DVD), a compact disk (CD), a Blu-ray disk, etc. storing the software and/or firmware. Further still, the example 200, 300 and the systems 1600, 2100 of FIGS. 2, 3, 4, 12, 13, 14, 16, and/or 21 may include one or more elements, processes and/or devices in addition to, or instead of, those illustrated in FIGS. 2, 3, 4, 12, 13, 14, 16, and/or 21, and/or may include more than one of any or all of the illustrated elements, processes and devices.

Figure 8:
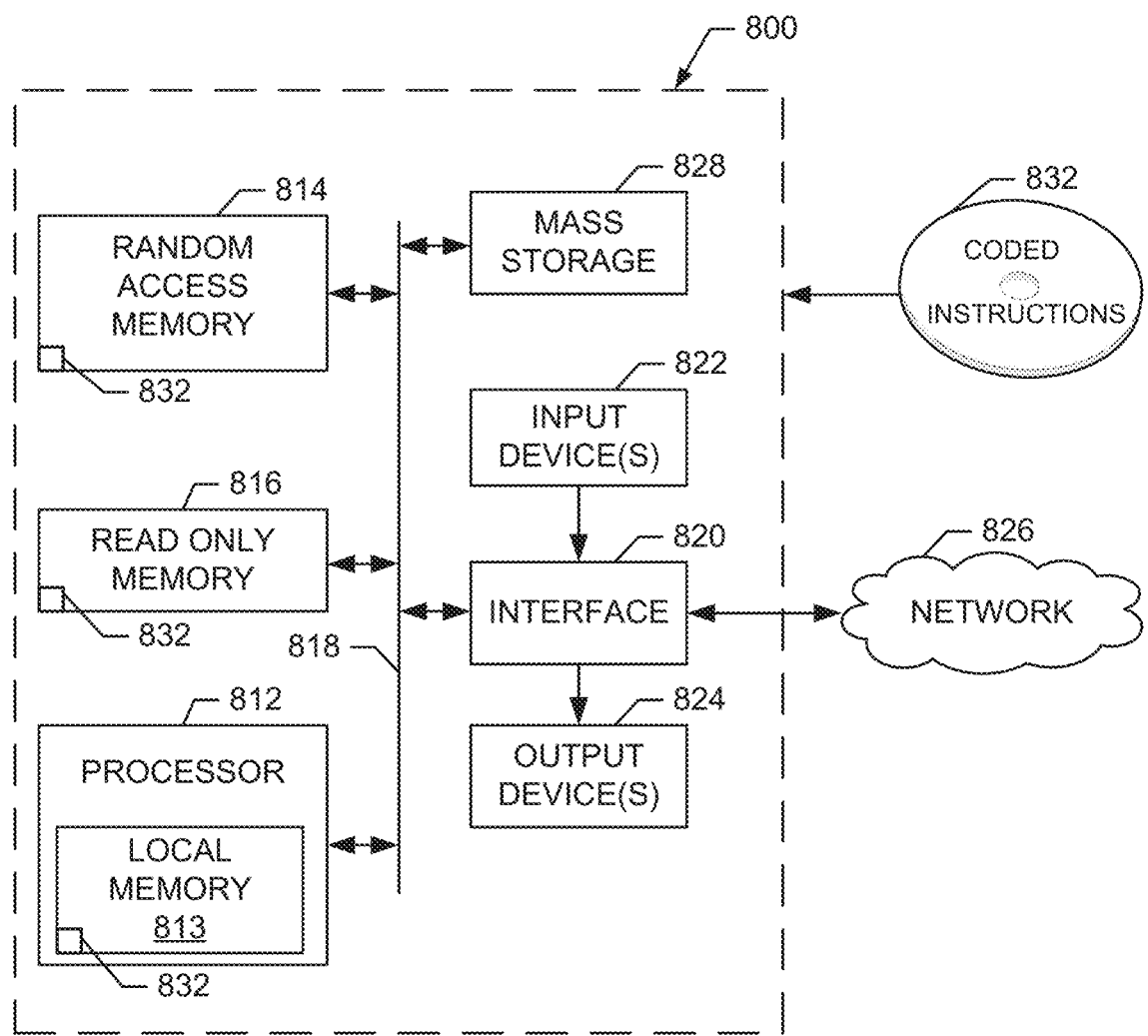
FIG. 8 illustrates an example processor system that may be used to execute the example instructions of FIGS. 5-7, 11, 15, 17, 18, 22, and 23 to implement example apparatus and systems disclosed herein.

FIG. 8 is a block diagram of an example computer 800 capable of executing the instructions of FIGS. 5-7, 11, 15, 17, 18, 22, and 23 to implement the apparatus 200 and/or 300 and/or the systems 1600 and/or 2100 of FIGS. 2, 3, 4, 12, 13, 14, 16, and/or 21. The computer 800 can be, for example, a server, a personal computer, or any other type of computing device. The system 800 of the illustrated example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

Coded instructions 832 representative of machine readable instructions of FIGS. 5-7, 11, 15, 17, 18, 22, and/or 23 may be stored in the mass storage device 828, in the volatile memory 814, in the non-volatile memory 816, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   instructions in the apparatus; and
   at least one processor configured to execute the instructions to:
   monitor for a mobile device communication at a merchant location;
   obtain a first identifier from the mobile device communication obtained at a first server in response to identifying the mobile device communication during the monitoring;
   store the first identifier in association with the merchant location in a database; and
   in response to determining that the first identifier is present in the database, send an association between the first identifier and the merchant location to a second server of an audience measurement entity, the first identifier included in a second communication from the second server of the audience measurement entity.

2. The apparatus of claim 1, wherein the first identifier includes a media access control address of a mobile device or a user identifier transmitted by the mobile device.

3. The apparatus of claim 1, wherein the at least one processor is configured to encrypt the association between the first identifier and the merchant location prior to sending the association to the audience measurement entity.

4. The apparatus of claim 1, wherein the at least one processor is configured to store a media identifier of media being displayed at a time of extraction of the first identifier.

5. The apparatus of claim 4, wherein the at least one processor is configured to send the media identifier in association with the first identifier.

6. The apparatus of claim 1, wherein the at least one processor is configured to decrypt the first identifier obtained from the audience measurement entity.

7. The apparatus of claim 1, wherein the at least one processor is configured to:
 access a second identifier obtained from the audience measurement entity in association with the first identifier; and
 send, to the second server, an association between the second identifier and at least one of the first identifier or the merchant location.

8. The apparatus of claim 1, wherein the at least one processor is configured to store at least one of a timestamp, a location code, proximity information, or a keyword.

9. An apparatus comprising:
 means for monitoring for a mobile device communication at a merchant location; and
 means for extracting a first identifier from the mobile device communication obtained at a first server in response to identifying the mobile device communication during the monitoring;
 the means for monitoring to:
  store the first identifier in association with the merchant location in a database; and
  in response to determining that the first identifier is present in the database, send an association between the first identifier and the merchant location to a second server of an audience measurement entity, the first identifier included in a second communication from the second server of the audience measurement entity.

10. The apparatus of claim 9, wherein the first identifier includes a media access control address of a mobile device or a user identifier transmitted by the mobile device.

11. The apparatus of claim 9, further including means for encrypting the association between the first identifier and the merchant location prior to sending the association to the audience measurement entity.

12. The apparatus of claim 9, wherein the means for extracting is to store a media identifier of media being displayed at a time of extraction of the first identifier.

13. The apparatus of claim 12, wherein the means for monitoring is to send the media identifier in association with the first identifier.

14. The apparatus of claim 9, further including means for decrypting the first identifier obtained from the audience measurement entity.

15. The apparatus of claim 9, wherein the means for monitoring is to:
 access a second identifier obtained from the audience measurement entity in association with the first identifier; and
 send an association between the second identifier and at least one of the first identifier or the merchant location.

16. The apparatus of claim 9, wherein the means for monitoring is to store at least one of a timestamp, a location code, proximity information, or a keyword.

17. A system, comprising:
 means for accessing communications, the means for accessing communications to:
  receive, via a first network communication, an encrypted identifier corresponding to a mobile device and a media identifier, the encrypted identifier and the media identifier reported by the mobile device based on the mobile device accessing media corresponding to the media identifier, the encrypted identifier to hide a first identifier identifying the mobile device or a user of the mobile device, and the encrypted identifier decryptable by a database proprietor to determine a decrypted identifier, the database proprietor being separate from an audience measurement entity, and the database proprietor to associate the decrypted identifier with the mobile device or the user of the mobile device;
  send, via a second network communication, a request for mobile device presence information to a second server of the database proprietor that stores the decrypted identifier when the mobile device is present at a merchant location, the request including the encrypted identifier; and
  receive, via a third network communication from the second server of the database proprietor, an indication that the mobile device was present at the merchant location; and
 means for storing behavior information, the means for storing behavior information to:
  query an advertisement database to identify an advertised entity corresponding to the media identifier; and
  store behavior information corresponding to the user of the mobile device with at least one of the encrypted identifier or the media identifier based on using network communications to correlate information associated with the user and stored across different network-connected devices without revealing the identity of the user to the audience measurement entity.

18. The system of claim 17, wherein the means for storing behavior information is to determine whether the database proprietor is associated with the advertised entity.

19. The system of claim 18, wherein the means for storing behavior information is to associate the advertised entity with the behavior information.

20. The system of claim 18, wherein the means for storing behavior information is to determine that an advertisement corresponding to the media identifier at least one of resulted in or is correlated with the user of the mobile device visiting the merchant location.

21. The system of claim 17, wherein the means for storing behavior information is to associate the media identifier and the encrypted identifier with a second identifier, the second identifier corresponding to at least one of the mobile device or the user of the mobile device.

22. The system of claim 21, wherein the second identifier is associated with a presence at a second merchant location.

* * * * *